(12) United States Patent
Nakamura et al.

(10) Patent No.: US 7,834,067 B2
(45) Date of Patent: Nov. 16, 2010

(54) PIGMENT COMPOSITION, INK COMPOSITION, PRINTED ARTICLE, INKJET RECORDING METHOD AND POLYALLYLAMINE DERIVATIVE

(75) Inventors: Ippei Nakamura, Kanagawa (JP); Norihide Shimohara, Kanagawa (JP); Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 143 days.

(21) Appl. No.: 12/395,721

(22) Filed: Mar. 2, 2009

(65) Prior Publication Data

US 2009/0233062 A1 Sep. 17, 2009

(30) Foreign Application Priority Data

Mar. 11, 2008 (JP) ............................. 2008-061782

(51) Int. Cl.
*C09D 11/00* (2006.01)
*C08F 20/54* (2006.01)
*C08J 7/18* (2006.01)

(52) U.S. Cl. ...................... 523/160; 524/555; 526/306; 427/100; 427/500

(58) Field of Classification Search ................. 526/306; 524/555; 427/100, 500; 523/160
See application file for complete search history.

(56) References Cited

U.S. PATENT DOCUMENTS

| 5,760,257 A * | 6/1998 | Tanaka et al. ............... 554/36 |
| 2004/0266911 A1 * | 12/2004 | Aida et al. ................. 523/160 |

FOREIGN PATENT DOCUMENTS

| JP | 5-214280 | 8/1993 |
| JP | 2003-119414 | 4/2003 |
| JP | 2003-321628 | 11/2003 |
| JP | 2004-18656 | 1/2004 |
| JP | 2004-131589 | 4/2004 |

* cited by examiner

*Primary Examiner*—David Wu
*Assistant Examiner*—Vu A Nguyen
(74) *Attorney, Agent, or Firm*—Solaris Intellectual Property Group, PLLC

(57) ABSTRACT

The present invention provides: a pigment composition that includes at least (A) a polyallylamine derivative including at least 1% to 50% by mol of a structural unit represented by Formula (1-a), 49% to 95% by mol of a structural unit represented by Formula (1-b) and 1% to 30% by mol of a structural unit represented by Formula (1-c), and (B) a pigment, and improves pigment dispersibility and dispersion stability; an ink composition, a printed article and an inkjet recording method, which use the pigment composition; and a polyallylamine derivative useful for these.

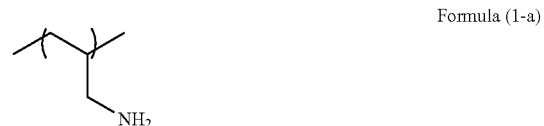

Formula (1-a)

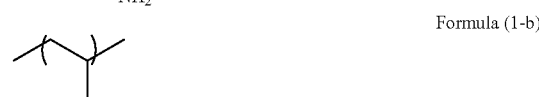

Formula (1-b)

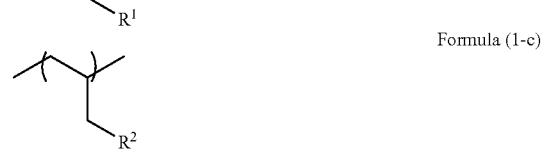

Formula (1-c)

In Formula (1-b), $R^1$ represents —$NHCOR^3$ or —$NH_3^+OCOR^3$, in which $R^3$ represents a residue obtained by removing a carboxy group from any one of polyester, polyamide or polyesteramide, which each have a free carboxylic acid. In Formula (1-c), $R^2$ represents —$NHCOR^4$ or —$NH_3^+OCOR^4$, in which $R^4$ represents an organic group having an aromatic ring or a heteroaromatic ring.

11 Claims, 1 Drawing Sheet

PIGMENT COMPOSITION, INK COMPOSITION, PRINTED ARTICLE, INKJET RECORDING METHOD AND POLYALLYLAMINE DERIVATIVE

CROSS-REFERENCE TO RELATED APPLICATION

This application claims priority under 35 USC 119 from Japanese Patent Application No. 2008-061782, the disclosure of which is incorporated by reference herein.

BACKGROUND OF THE INVENTION

1. Field of the Invention

The present invention relates to a pigment composition preferably used in color filters, inkjet inks and the like. Furthermore, the invention relates to an ink composition that uses the pigment composition and is suitably used for inkjet recording, a printed article obtained by use of the ink composition, and an inkjet recording method that uses the ink composition. In more detail, the invention relates to an ink composition that is excellent in the dispersibility of a coloring agent, excellent in color forming property, cured by irradiation with an actinic radiation ray without generating a volatile component, capable of forming high quality images and suitable for inkjet recording, a printed article obtained by use of the ink composition, and an inkjet recording method that uses the ink composition. Furthermore, the invention relates to a novel polyallylamine derivative suitably usable in the pigment composition and ink composition.

2. Related Art

Electrophotographic systems, sublimation-type and melting-type thermal transfer systems, and inkjet systems are image recording methods of forming an image on a recording medium such as paper based on image data signals. In particular, inkjet systems are applicable to an inexpensive apparatus, and perform direct image formation on a recording medium by ejecting ink only to image areas where ink deposition is necessary; therefore, inkjet systems use ink effectively, thus reducing the running cost. Further, inkjet systems generate less noise and are superior image recording systems.

Inkjet systems enable printing on recording media that do not absorb water, such as plastic sheets and metallic plates, as well as on paper. In inkjet systems, it is an important task to achieve higher printing speed and higher printing quality. Therefore, the time liquid droplets take to dry and cure after printing has significant influence on the sharpness of the image.

In one inkjet system, an inkjet recording ink that can be cured by irradiation with an actinic radiation ray is used (for example, see Japanese Patent Application Laid-Open (JP-A) No. 5-214280). According to this system, sharp images can be formed by curing ink droplets by irradiation with an actinic radiation ray just after printing.

In order to form highly accurate images with excellent color forming properties, such a curable ink composition as a curable ink for inkjet recording is required to have high pigment dispersibility, and stability over time. Reduction in the pigment size is necessary for imparting clear color tone and high tinting strength to the ink composition. In particular, concerning the ink used for inkjet recording, ejected droplets of the inkjet ink exert a significant influence on the sharpness of images; therefore, the ejection quantity of the ink droplets needs to be small, and the size of the pigment particles contained in the ink has to be smaller than the thickness of the film formed by curing of the ink. However, when the size of the pigment particles is reduced so as to achieve higher tinting strength, the fine pigment particles are hard to disperse, and aggregates are easily formed. Another problem is created in that the viscosity of the ink composition is increased by the addition of a dispersant. The formation of the pigment aggregates and the increase in the viscosity of the ink composition both adversely affect ink ejection property, and such an ink composition is not preferred.

When an ink composition is used for inkjet recording, the ink composition is contained in a cartridge. The ink composition in the cartridge is heated at ejection and cooled at a non-ejection time or during storage; in this way, the ink composition undergoes repeated temperature changes (heating-cooling). These temperature changes also adversely affect the pigment dispersibility, and the pigment dispersibility is deteriorated with time, whereby problems are created in that aggregation of dispersed pigments and increase in the viscosity of the ink composition easily occur.

Accordingly, there is a demand for an ink composition having sufficient fluidity and excellent stability of the pigment dispersion over time, in which fine pigment particles are dispersed stably. Various proposals have been made concerning dispersants for achieving stable pigment dispersions.

For improving affinity with the pigment, an ink composition using a pigment derivative as a dispersant (see, for example, JP-A Nos. 2003-119414 and 2004-18656), an ink composition that uses a polymer having a basic group as a dispersant for a specific pigment such as a phthalocyanine-based or quinacridone-based pigment (see, for example, JP-A No. 2003-321628), and an ink composition (see, for example, JP-A No. 2004-131589) which is free of organic solvent and contains a dispersant, such as a poly(ethyleneimine)-poly(12-hydroxystearic acid) graft polymer, and a specific monomer that dissolves the dispersant have been proposed.

In these ink compositions, the pigment dispersibility is certainly improved owing to the function of the dispersant. However, the size of the pigment used in the ink composition is not sufficiently small, and there is a room for improvement of dispersibility of finer pigment particles. Further, the ink composition also has a problem in that the dispersion stability upon long-term storage or upon repeated temperature changes is still insufficient.

SUMMARY OF THE INVENTION

In view of the above circumstances, it is an object of the present invention to provide a pigment composition preferably used in color filters and inkjet inks; an ink composition that uses the pigment composition and is suitably used for inkjet recording; a printed article obtained by use of the ink composition; an inkjet recording method that uses the ink composition; and a novel polyallylamine derivative suitably usable in the pigment composition and ink composition. More specifically, according to an aspect of the invention, a pigment composition that includes at least: (A) a polyallylamine derivative including at least 1% to 50% by mol of a structural unit represented by the following Formula (1-a), 49% to 95% by mol of a structural unit represented by the following Formula (1-b) and 1% to 30% by mol of a structural unit represented by the following Formula (1-c); and (B) a pigment, and improves pigment dispersibility and dispersion stability; an ink composition, a printed article and an inkjet recording method, which use the pigment composition; and a polyallylamine derivative useful for these; are provided.

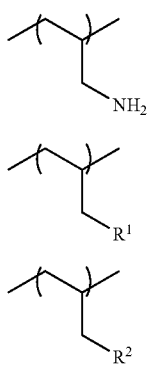

Formula (1-a)

Formula (1-b)

Formula (1-c)

wherein, in Formula (1-b), $R^1$ represents —NHCOR$^3$ or —NH$_3^+$OCOR$^3$, in which $R^3$ represents a residue obtained by removing a carboxy group from any one of polyester, polyamide or polyesteramide, each having a free carboxylic acid; and in Formula (1-c), $R^2$ represents —NHCOR$^4$ or —NH$_3^+$OCOR$^4$, in which $R^4$ represents an organic group having an aromatic ring or a heteroaromatic ring.

DETAILED DESCRIPTION OF THE INVENTION

Figure 1:
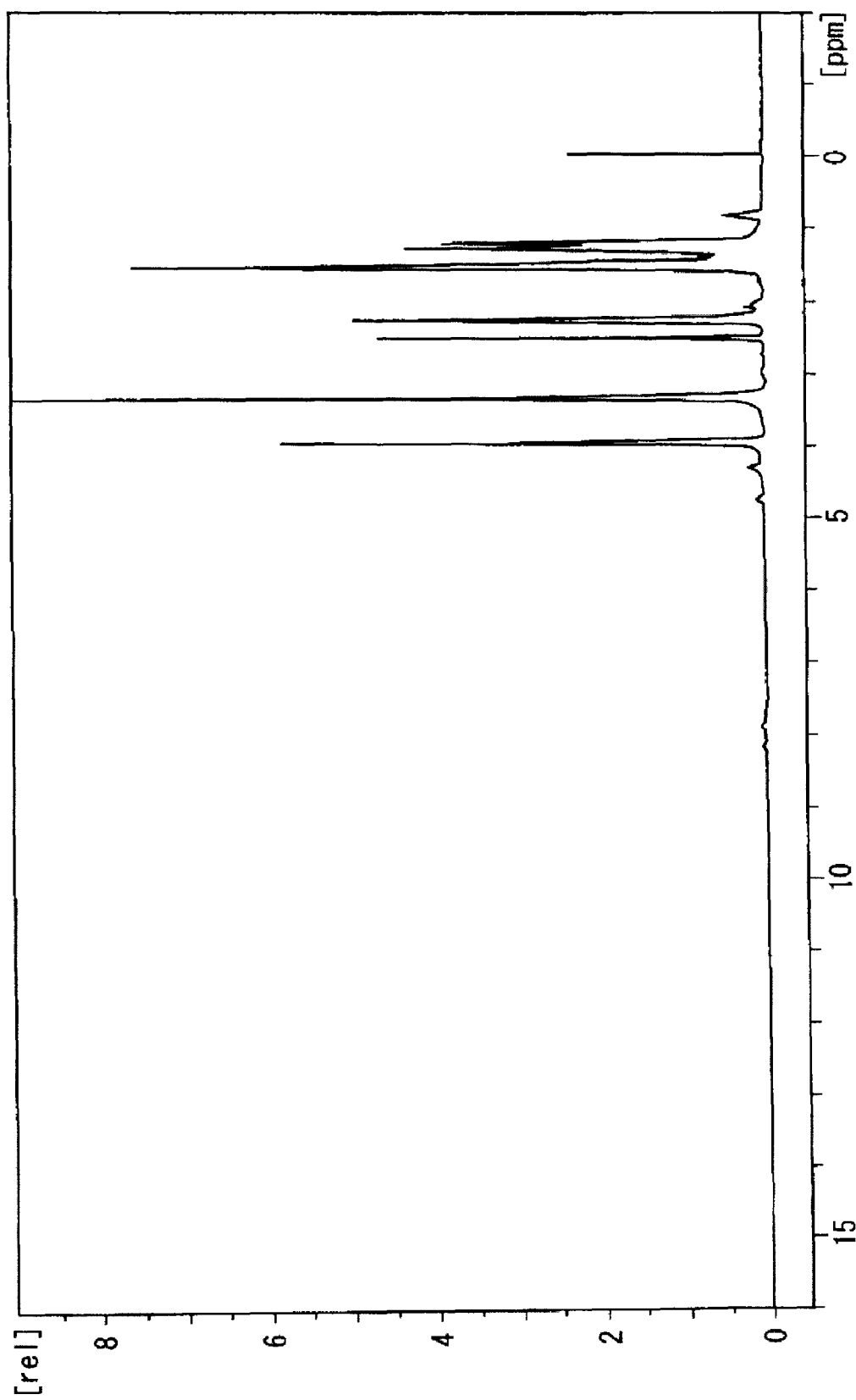
FIG. 1 shows a 1H-NMR spectrum of a compound obtained in Example 1.

The present invention intends to overcome the above-mentioned various problems in existing technologies to achieve objects described below. That is, the invention intends to provide a pigment composition excellent in the dispersibility and dispersion stability even when a pigment is made of fine particles.

Furthermore, the invention intends to provide an ink composition that uses the pigment composition of the invention, is capable of forming high quality images having clear color tones and high tinting sterngth and is cured by irradiation with an actinic radiation ray and suitable for an inkjet recording method, a printed article obtained by use of the ink composition and an inkjet recording method that uses the ink composition.

Furthermore, the invention intends to provide a novel polyallylamine derivative useful as a pigment dispersant excellent in the dispersibility and dispersion stability even when a pigment is made of fine particles.

The inventors studied hard and found that the foregoing objects are achieved when a specified polyallylamine derivative is used as a pigment dispersant, whereby the invention came to completion.

That is, a pigment composition of the invention includes at least: (A) a polyallylamine derivative; and (B) a pigment, the (A) polyallylamine derivative containing at least 1% to 50% by mol of a structural unit represented by the following Formula (1-a), 49% to 95% by mol of a structural unit represented by the following Formula (1-b) and 1% to 30% by mol of a structural unit represented by the following Formula (1-c).

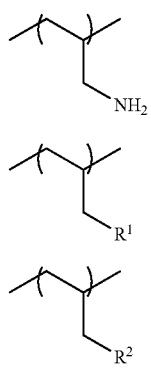

Formula (1-a)

Formula (1-b)

Formula (1-c)

Herein, in Formula (1-b), $R^1$ represents —NHCOR$^3$ or —NH$_3^+$OCOR$^3$, in which $R^3$ represents a residue obtained by removing a carboxy group from any one of polyester, polyamide or polyesteramide, each having a free carboxylic acid. In Formula (1-c), $R^2$ represents —NHCOR$^4$ or —NH$_3^+$OCOR$^4$, in which $R^4$ represents an organic group having an aromatic ring or a heteroaromatic ring.

The ink composition of the invention contains the pigment composition of the invention and further contains (C) a polymerizable compound.

The ink composition of the invention is preferred to further contain (D) a polymerization initiator. Furthermore, the ink composition of the invention is suitably used for inkjet recording.

Furthermore, the inventors have found that a novel polyallylamine derivative having a specified structure is useful as a pigment dispersant used in the pigment composition and ink composition of the invention.

That is, the polyallylamine derivative of the invention contains at least: 1% to 50% by mol of a structural unit represented by the following Formula (1-a); 49% to 95% by mol of a structural unit represented by the following Formula (1-b); and 1% to 30% by mol of a structural unit represented by the following Formula (1-c).

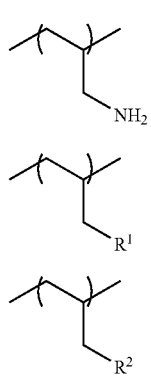

Formula (1-a)

Formula (1-b)

Formula (1-c)

Herein, in Formula (1-b), $R^1$ represents —NHCOR$^3$ or —NH$_3^+$OCOR$^3$, in which $R^3$ represents a residue obtained by removing a carboxy group from any one of polyester, polyamide or polyesteramide, each having a free carboxylic acid. In Formula (1-c), $R^2$ represents —NHCOR$^4$ or —NH$_3^+$OCOR$^4$, in which $R^4$ represents an organic group having an aromatic ring or a heteroaromatic ring.

Furthermore, the inventors have found that when the ink composition of the invention is used, a printed article where a high quality image having clear color tones and high tinting strength is formed is obtained.

That is, a printed article of the invention is obtained by curing the ink composition of the invention applied on a recording medium.

The inventors have found that when an inkjet recording method that uses the ink composition of the invention is used, a high quality image having clear color tones and high tinting strength is formed.

That is, an inkjet recording method of the invention includes a step of ejecting the ink composition of the invention on a recording medium and a step of irradiating an actinic radiation ray to the ejected ink composition to cure the ink composition.

In the beginning, a polyallylamine derivative that is a characteristic component used in a pigment composition of the present invention will be described.

[Polyallylamine Derivative]

A polyallylamine derivative of the invention contains at least: a structural unit represented by the following Formula (1-a); a structural unit represented by the following Formula (1-b); and a structural unit represented by the following Formula (1-c), and is useful as a pigment dispersant.

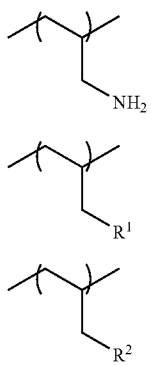

<$R^1$ in Formula (1-b)>

In Formula (1-b), $R^1$ represents —NHCOR$^3$ or —NH$_3^+$OCOR$^3$, herein, —NHCOR$^3$ being more preferred.

Herein, $R^3$ represents a residue obtained by removing a carboxy group from any one of polyester, polyamide or polyesteramide, each having a free carboxylic acid. That is, "any one of polyester, polyamide or polyesteramide, each having a free carboxylic acid" is represented by $R^3$—COOH.

A molecular weight of the "any one of polyester, polyamide or polyesteramide, which have a free carboxylic acid" is preferably from 500 to 200,000, more preferably from 700 to 100,000 and still more preferably from 800 to 50,000.

Specific examples of the "any one of polyester, polyamide or polyesteramide, which have a free carboxylic acid" include those represented by any of the following Formulae (2) through (5).

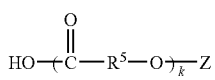
Formula (2)

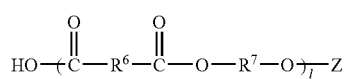
Formula (3)

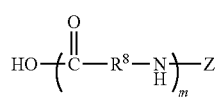
Formula (4)

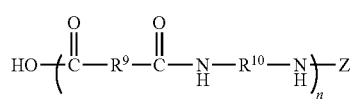
Formula (5)

In Formula (2), $R^5$ represents a straight or branched alkylene group having 2 to 20 carbon atoms, Z represents a hydrogen atom or a "monovalent organic group obtained by removing a hydroxy group from a carboxy group of a polymerization terminator" and k represents an integer from 2 to 100. The number of carbon atoms of the alkylene group represented by $R^5$ is preferably from 2 to 12 and more preferably from 4 to 8. Furthermore, k is preferably from 2 to 80 and more preferably 4 to 60.

Herein, the polymerization terminator is a carboxylic acid that does not have a hydroxy group. That is, the polymerization terminator is represented by $R^{13}$—COOH, herein, Z is represented by —COR$^{13}$. Furthermore, $R^{13}$ is a monovalent organic group that does not have a hydroxy group, and preferably an alkyl group having 1 to 20 carbon atoms.

Examples of the polymerization terminator include known polymerization terminators usually used such as caproic acid, lauric acid, stearic acid and methoxy acetate.

In Formula (3), $R^6$ represents a straight or branched alkylene group having 2 to 20 carbon atoms, C$_6$H$_4$ or CH=CH, $R^7$ represents a straight or branched alkylene group having 2 to 20 carbon atoms or a residue obtained by removing two hydroxy groups from polyalkylene glycol, Z has the same meaning as in Formula (2), and l represents an integer from 2 to 100. In one or both of $R^6$ and $R^7$, a chain may include an ether bond. The number of carbon atoms of the each alkylene group represented by $R^6$ or $R^7$ is preferably from 2 to 12 and more preferably from 4 to 8. Furthermore, l is preferably from 2 to 80 and more preferably from 4 to 60.

In Formula (4), $R^8$ represents a straight or branched alkylene group having 2 to 20 carbon atoms, Z has the same meaning as in Formula (2), and m represents an integer from 2 to 100. The number of carbon atoms of the alkylene group represented by $R^8$ is preferably from 2 to 12 and more preferably from 4 to 8. Furthermore, m is preferably from 2 to 80 and more preferably from 4 to 60.

In Formula (5), $R^9$ represents a straight or branched alkylene group having 2 to 20 carbon atoms, C$_6$H$_4$ or CH=CH, $R^{10}$ represents a straight or branched alkylene group having 2 to 20 carbon atoms, Z has the same meaning as in Formula (2), and n represents an integer from 2 to 100. The number of carbon atoms of the each alkylene group represented by $R^9$ or $R^{10}$ is preferably from 2 to 12 and more preferably from 2 to 8. Furthermore, n is preferably from 2 to 80 and more preferably from 4 to 60.

That is, for instance, in the case where the "polyester having a free carboxylic acid" is, a polyester represented by Formula (2), $R^3$ is a residue represented by the following Formula (2-a), and in the case where the "polyester having a free carboxylic acid" is a polyester represented by Formula (3), $R^3$ is a residue represented by the following Formula (3-a). Furthermore, in the case where the "polyamide having a free carboxylic acid" is a polyamide represented by Formula (4), $R^3$ is a residue represented by the following Formula (4-a), and in the case where the "polyamide having a free carboxylic acid" is a polyamide represented by Formula (5), $R^3$ is a residue represented by the following Formula (5-a).

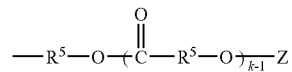
Formula (2-a)

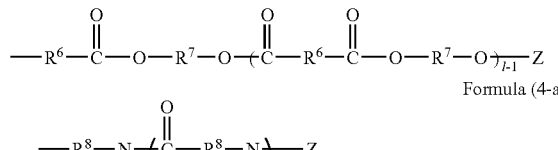
Formula (3-a)

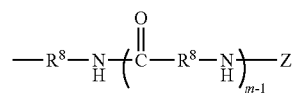
Formula (4-a)

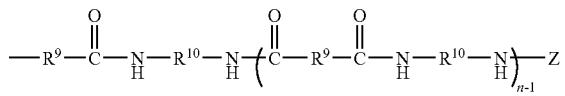
Formula (5-a)

Furthermore, $R^3$ may be a residue represented by any one of Formulae (2-a) through (5-a) shown above, that is, a residue containing only one of structural units represented by any one of Formulae (2-b) through (5-b). Further, $R^3$ may be a residue containing a plurality of the structural units represented by any one of Formulae (2-b) through (5-b) shown below. Still furthermore, $R^3$ may be a residue containing at least one of the structural units represented by any one of Formulae (2-b) through (5-b) and other structural unit. Herein, $R^5$ to $R^{10}$, k, l, m, n and Z in Formulae (2-a) to (5-a) shown above and Formulae (2-b) to (5-b) shown below each have the same meaning as in Formulae (2) to (5) shown above.

As $R^3$, other than the residue represented by any one of Formulae (2-a) through (5-a) shown above, for example, a residue containing a polyester chain in which a structural unit represented by Formula (2-b) and a structural unit represented by Formula (3-b) are randomly polymerized (hereinafter, in some cases, referred to as "random copolyester residue"), a residue containing a polyamide chain in which a structural unit represented by Formula (4-b) and a structural unit represented by Formula (5-b) are randomly polymerized (hereinafter, in some cases, referred to as "random copolyamide residue"), and a residue containing a polyesteramide chain in which at least one kind of a structural unit represented by Formula (2-b) and a structural unit represented by Formula (3-b) and at least one of a structural unit represented by Formula (4-b) and a structural unit represented by Formula (5-b) are randomly polymerized (hereinafter, in some cases, referred to as "random copolyesteramide residue") are cited.

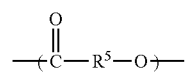
Formula (2-b)

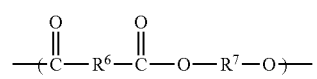
Formula (3-b)

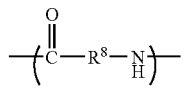
Formula (4-b)

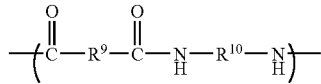
Formula (5-b)

$R^3$ is preferably a residue represented by Formula (2-a) or (3-a) or the "random copolyester residue" from the viewpoint of inhibiting the viscosity from increasing when a pigment composition is formed.

As the polyester represented by Formula (2) or (3) or a polyester obtained by bonding a carboxy group to the "random copolyester residue" (hereinafter, in some cases, referred to as "random copolyester"), specifically, for example, a self-condensate of hydroxycarboxylic acid, a self-condensate of lactone or a mixed condensate of hydroxycarboxylic acid and lactone is preferred.

Specific examples of hydroxycarboxylic acid include ricinolic acid, ricinoleic acid, a mixture of 9-hydroxystearic acid and 10-hydroxystearic acid, 12 hydroxystearic acid, ricinus fatty acid, hydrogenated ricinus fatty acid and lactic acid.

Specific examples of lactone include ε-caprolactone, β-propiolactone, γ-butyrolactone, δ-valerolactone, β-methyl-δ-valerolactone, 4-methylcaprolactone and 2-methylcaprolactone.

The most preferable examples of the polyester represented by Formula (2) or (3) or "random copolyester" include a self-condensate of 12-hydroxystearic acid, a self-condensate of ε-caprolactone and a condensate obtained from a mixture of 12-hydroxystearic acid and ε-caprolactone.

When the condensation is performed, the "carboxylic acid that does not contain a hydroxy group" may be added as a polymerization terminator.

<$R^2$ in Formula (1-c)>

In Formula (1-c), $R^2$ represents —NHCOR$^4$ or —NH$_3^+$OCOR$^4$, herein, —NHCOR$^4$ being more preferred.

Herein, $R^4$ represents an organic group having an aromatic ring or a heteroaromatic ring, and a monovalent organic group represented by the following Formula (6) or (7) is preferred.

—X—R$^{11}$      Formula (6)

—Y—R$^{12}$      Formula (7)

Herein, X in Formula (6) and Y in Formula (7) each independently represent a single bond or a divalent organic group. Specific examples of the divalent organic group include an alkylene group having 1 to 8 carbon atoms, an ether bond (—O—), a sulfide bond (—S—), a group (—NH—) obtained by removing one hydrogen atom from an amino group and a combination thereof. X in Formula (6) and Y in Formula (7) are each preferably a single bond or —NH—.

In Formula (6), $R^{11}$ represents a "group having an aromatic ring". Specific examples of the aromatic ring include a benzene ring, a naphthalene ring and an anthracene ring, among these a naphthalene ring or an anthracene ring that has a condensed ring structure being preferred.

The "group having an aromatic ring" is not particularly limited as long as it is a monovalent substituent having an aromatic ring. For instance, a group made of an aromatic ring alone, a group obtained by adding an atom other than carbon and hydrogen to an aromatic ring, and a group obtained by further introducing a substituent in an aromatic ring are cited. However, the aromatic ring is preferred to directly bond to X in Formula (6).

As the "atoms other than carbon and hydrogen" that may be added to an aromatic ring, for instance, an oxygen atom, a sulfur atom and a halogen atom are cited. As the substituent that may be introduced in the aromatic ring, specifically, an alkyl group having 1 to 12 carbon atoms, an alkoxy group, an aryl group, an aralkyl group, a nitro group and a cyano group are cited. Furthermore, a plurality of substituent groups may be introduced in an aromatic ring.

Among the "groups having an aromatic ring" like this, groups having an anthracene, naphthalene or anthraquinone skeleton are more preferred, compounds represented by the following Formulae (8) to (13) being still more preferred. In Formulae (8) to (13), a bonding site is shown with a mark "*".

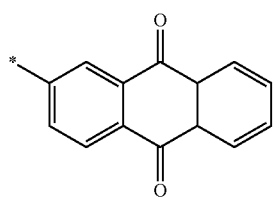

Formula (8)

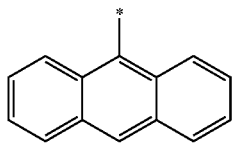

Formula (9)

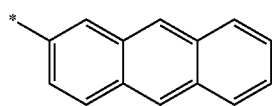

Formula (10)

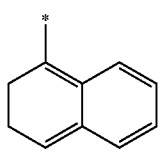

Formula (11)

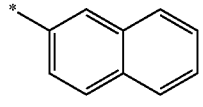

Formula (12)

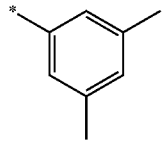

Formula (13)

In Formula (7), $R^{12}$ represents a "group having a heteroaromatic ring". The heteroaromatic ring is preferred to have at least one hydrogen bond group in the molecule. Specific examples thereof include thiophene, furan, xanthene, pyrrole, imidazole, isoindoline, isoindolinone, benzimidazolone, indole, quinoline, carbazole, acridine, acridone, quinacridone, phthalimide, chinaldine and quinophthalone. The heteroaromatic ring is preferred to be a heteroaromatic ring having a condensed ring structure. Specific examples thereof include benzimidazolone, indole, quinoline, carbazole, acridine, acridone and phthalimide. Furthermore, the heteroaromatic ring is more preferred to be a heteroaromatic ring that forms a colorant described below.

The "group having a heteroaromatic ring" is not particularly limited so long as it is a monovalent substituent having a heteroaromatic ring. For instance, a group made of a heteroaromatic ring alone, a group obtained by adding an atom other than carbon and hydrogen to a heteroaromatic ring, and a group obtained by further introducing a substituent in a heteroaromatic ring are cited. However, the heteroaromatic ring is preferred to directly bond to Y in Formula (7).

As the "atoms other than carbon and hydrogen" that may be added to an aromatic ring, for instance, an oxygen atom, a sulfur atom and a halogen atom are cited. As the substituent that may be introduced in the heteroaromatic ring, specifically, for example, an alkyl group having 1 to 12 carbon atoms, an alkoxy group, an aryl group, an aralkyl group, a nitro group and a cyano group are cited.

Among the "groups having a heteroaromatic ring" like this, groups having a benzimidazolone, indole, quinoline, carbazole, acridine, acridone or phthalimide skeleton are preferred, compounds represented by the following Formulae (14) to (18) being more preferred. In Formulae (14) to (18), a bonding site is shown with a mark "*".

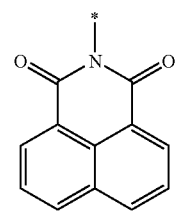

Formula (14)

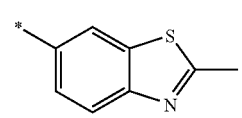

Formula (15)

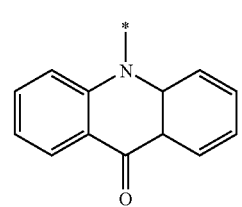

Formula (16)

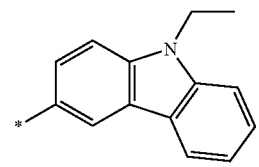

Formula (17)

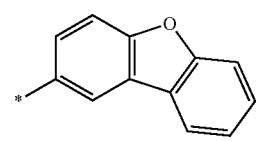

Formula (18)

<Molar Fraction>

When molar fractions of a structural unit represented by Formula (1-a), a structural unit represented by Formula (1-b) and a structural unit represented by Formula (1-c), which are present in a polyallylamine derivative, are represented by a, b and c, respectively, a is from 1% to 50%, b is from 50% to 95% and c is from 1% to 30%, and preferably a is from 1% to 30%, b is from 60% to 90% and c is from 1% to 20%. Herein, a+b+c≦100% is satisfied.

Furthermore, a structural unit represented by Formula (1-b) and a structural unit represented by Formula (1-c), which are present in a polyallylamine derivative, may be only one kind or a plurality of them, respectively. In the case where a plurality of structural units represented by Formula (1-b) is present in a polyallylamine derivative, the molar fraction b represents a sum total of molar fractions of all of the "structural units represented by Formula (1-b)". The situation is the same as to the molar fraction c.

<Synthesis Method of Polyallylamine Derivative>

A polyallylamine derivative of the invention is produced by reacting polyallylamine with the "any one of polyester, polyamide or polyesteramide, which have a free carboxylic acid", and a carboxylic acid or a carboxylic acid derivative, each having a "group having an aromatic ring" represented by $R^{11}$ of Formula (6) or a "group having a heteroaromatic ring" represented by $R^{12}$ of Formula (7), or isocyanate. The reactions may be simultaneously carried out or the respective reactions may be carried out sequentially, and known amidation reaction and ureation reaction may be utilized.

The polyallylamine that is used to produce the polyallylamine derivative of the invention is obtained by polymerizing allylamine in the presence of a polymerization initiator and, as required, a chain transfer catalyst.

The polymerization initiator is not limited to particular one. Polymerization initiators usually used in the field such as ketone peroxides such as methyl ethyl ketone, diacyl peroxides such as benzoyl peroxide, peroxydicarbonates such as diisopropyl peroxydicarbonate, peroxyketals such as 1,1-bis (t-butylperoxy)cyclohexane, hydroperoxides such as t-butyl hydroperoxide, peroxyesters such as t-butyl peroxypivalate, and others such as azobisisobutylonitrile, hydrogen peroxide, ferrous salt are cited. Furthermore, polymerization initiators described in Japanese Patent Application Publication (JP-B) No. 02-14364 may be used.

Examples of the chain transfer catalyst include alkyl mercaptans such as lauryl mercaptan, thiocarboxylic acids such as mercaptoacetic aid, 2-mercaptopropionic acid and 3-mercaptopropionic acid and thiocarboxylic acid esters such as butyl thioglycolate and 2-ethylhexyl thioglycolate without limiting thereto.

A weight average molecular weight of the polyallylamine used in the invention is preferably from 150 to 100,000 and more preferably from 600 to 20,000.

The reason why the weight average molecular weight of the polyallylamine used in the invention is preferable to be from 150 to 100,000 is because when the weight average molecular weight is less than 150, the absorptive power to the pigment is insufficient to be difficult to disperse the pigment and when the weight average molecular weight is more than 100,000, pigment particles flocculate each other to be difficult to disperse the pigment.

The weight average molecular weight is measured according to a known method such as gel permeation chromatography (GPC) and examples of GPC unit include HLC-8220 series (manufactured by Tosoh Corporation).

As the polyallylamine, commercially available products may be used. Examples of the commercially available product thereof include polyallylamine (product number: 479136, 479144, manufactured by Sigma-Aldrich) and polyallylamine (PAA-01, PAA-03, PAA-05, PAA-08, PAA-15, PAA-15C, PAA-25, PAA-H-10C, manufactured by Nittobo). Furthermore, the molecular weight of the polyallylamine may be arbitrarily controlled according to a method described in JP-B No. 02-14364.

A weight average molecular weight of the polyallylamine derivative of the invention obtained by the foregoing reaction is preferably from 2,000 to 100,000 in the case of using as a pigment dispersant.

A structure of the polyallylamine derivative can be analyzed, for instance, by 1H-NMR measurement.

Preferable examples of the polyallylamine derivative of the invention will be shown below. However, the invention is not limited thereto. In the description below, "Mw" means a weight average molecular weight.

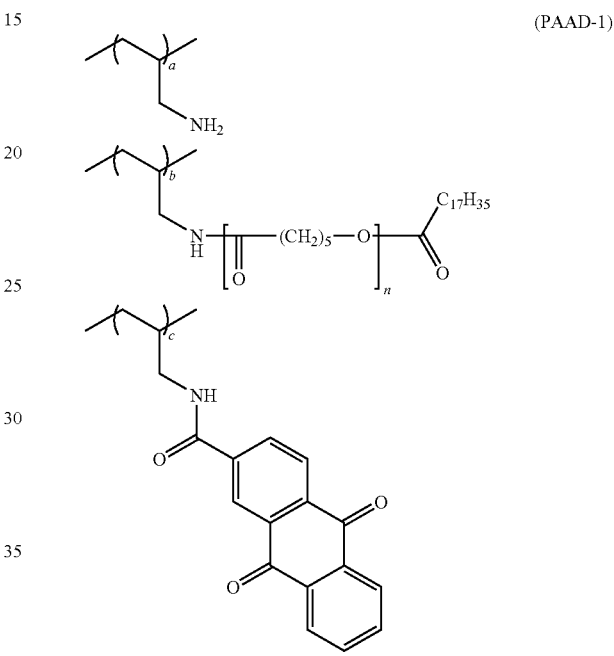

(PAAD-1-1): a = 17%, b = 80%, c = 3%, n = 2~3, Mw = 16,000
(PAAD-1-2): a = 26%, b = 70%, c = 4%, n = 16, Mw = 3,800

(PAAD-2-1): a = 18%, b = 80%, c = 2%, n = 4, Mw = 4,000

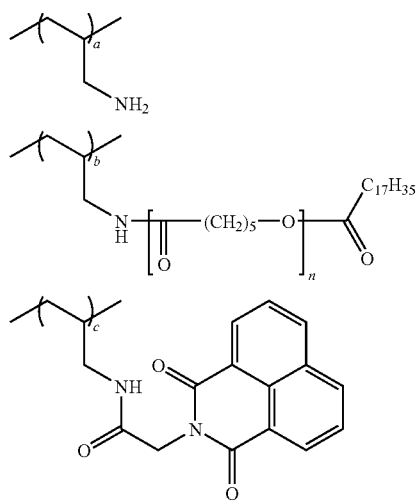
(PAAD-3-1): a = 15%, b = 84%, c = 1%, n = 16, Mw = 4,000
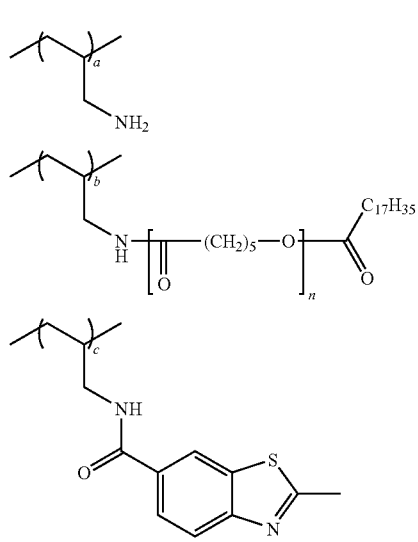
(PAAD-4-1): a = 20%, b = 75%, c = 5%, n = 8, Mw = 6,500
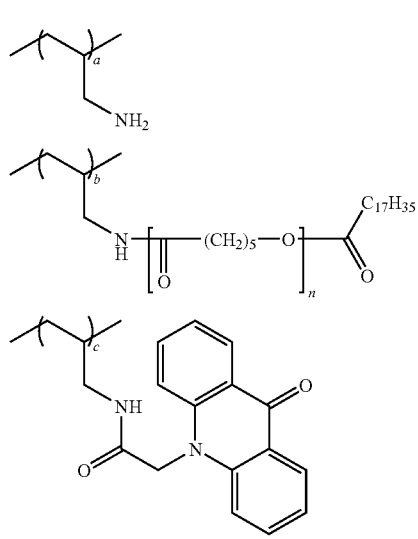
(PAAD-5-1): a = 18%, b = 80%, c = 2%, n = 4, Mw = 12,000
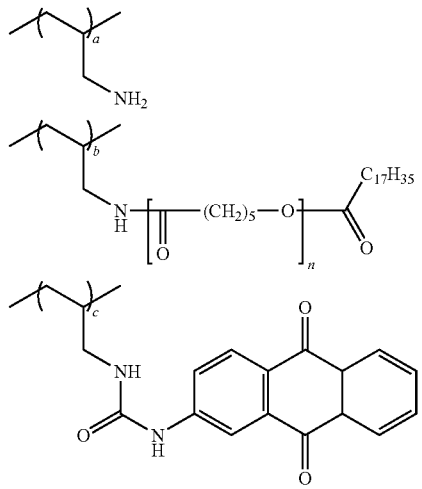
(PAAD-6-1): a = 14%, b = 85%, c = 1%, n = 4, Mw = 4,000
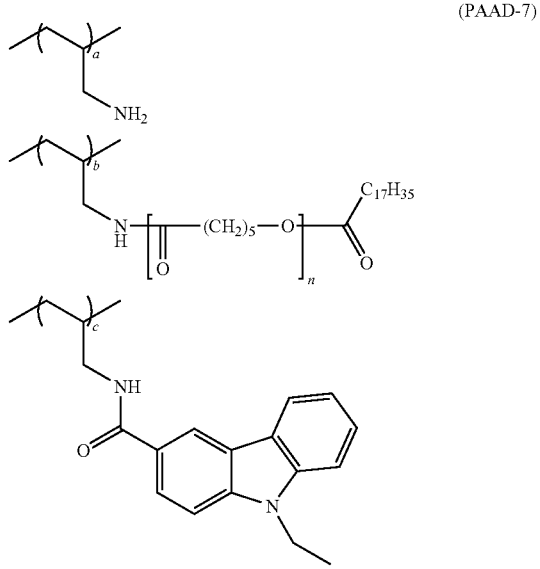
(PAAD-7-1): a = 18%, b = 78%, c = 4%, n = 16, Mw = 6,000
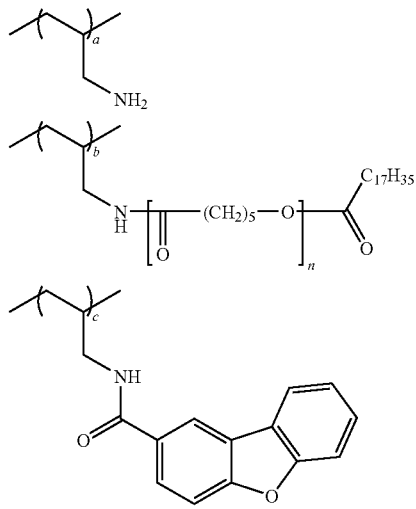
(PAAD-8-1): a = 22%, b = 75%, c = 3%, n = 4, Mw = 3,800

-continued (PAAD-9)

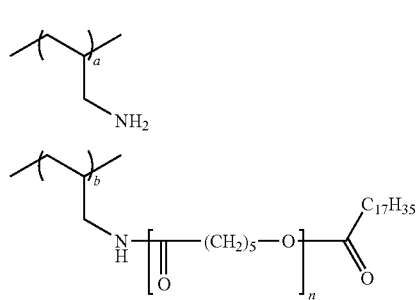

(PAAD-9-1): a = 26%, b = 70%, c = 4%, n = 16, Mw = 3,700

(PAAD-10)

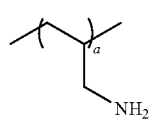

(PAAD-10-1): a = 24%, b = 75%, c = 1%, n = 4, Mw = 6,000

(PAAD-11)

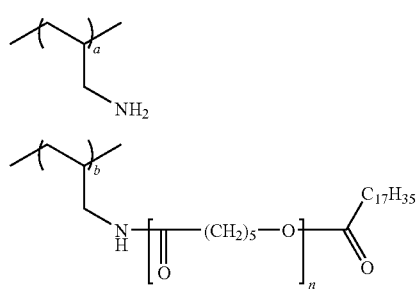

-continued

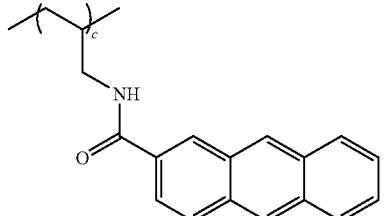

(PAAD-11-1): a = 16%, b = 79%, c = 5%, n = 4, Mw = 3,800

(PAAD-12)

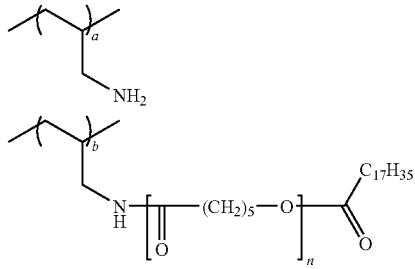

(PAAD-12-1): a = 26%, b = 70%, c = 4%, n = 16, Mw = 3,700

(PAAD-13)

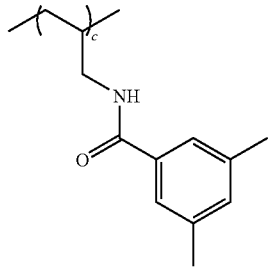

(PAAD-13-1): a = 18%, b = 78%, c = 4%, n = 8, Mw = 3,800

Since the polyallylamine derivative of the invention has the above-mentioned structure, even fine pigment particles are dispersed with excellent dispersibility and dispersion stability thereof. Accordingly, when the polyallylamine derivative of the invention is contained in a pigment dispersion composition or an ink composition, the viscosity of the composition and particle diameters of particles in the composition are inhibited from varying with time.

In the next place, a pigment composition and an ink composition of the invention will be described.

[Pigment Composition and Ink Composition]

The pigment composition of the invention includes at least: (A) a polyallylamine derivative; and (B) a pigment and, as required, other components. The (A) polyallylamine derivative contains at least 1% to 50% by mol of a structural unit represented by the following Formula (1-a), 49% to 95% by mol of a structural unit represented by the following Formula (1-b) and 1% to 30% by mol of a structural unit represented by the following Formula (1-c).

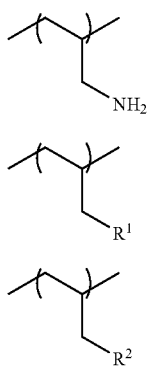

Formula (1-a)

Formula (1-b)

Formula (1-c)

Herein, in Formula (1-b), $R^1$ represents —$NHCOR^3$ or —$NH_3^+OCOR^3$, in which $R^3$ represents a residue obtained by removing a carboxy group from any one of polyester, polyamide or polyesteramide, each having a free carboxylic acid. In Formula (1-c), $R^2$ represents —$NHCOR^4$ or —$NH_3^-OCOR^4$, in which $R^4$ represents an organic group having an aromatic ring or a heteroaromatic ring.

Herein, the (A) polyallylamine derivative includes the above-mentioned polyallylamine derivatives of the invention.

The (A) polyallylamine derivative becomes readily interacting with the pigment because the structural unit represented by Formula (1-c) contained in the (A) polyallylamine derivative has a structure high in the affinity with the pigment. On the other hand, a distance between pigment particles is maintained owing to steric repulsion of high molecular chains because a structural unit represented by Formula (1-b) contained in the (A) polyallylamine derivative has a high molecular chain having a specified repetition structural units. Owing to a balance between the interaction and the steric repulsion effect, the pigment dispersibility of the (A) polyallylamine derivative becomes excellent. Furthermore, the interaction and steric repulsion effect are due to a stable structure that the (A) polyallylamine derivative has; accordingly, the variation due to aging is less and the pigment dispersion stability as well becomes excellent.

The ink composition of the invention includes at least (C) a polymerizable compound and, as required, other components, as well as the (A) polyallylamine derivative and the (B) pigment.

The (A) polyallylamine derivatives of the invention may be added singularly or in a combination of two or more of them in the pigment composition or ink composition of the invention.

A content of the (A) polyallylamine derivative in the pigment composition or ink composition is preferably from 1 part to 100 parts by mass and more preferably from 5 parts to 50 parts by mass with respect to 100 parts by mass of an addition amount of the (B) pigment.

The (A) polyallylamine derivative in the invention is preferably used as a pigment dispersant. The (A) polyallylamine derivative has a structure high in the affinity with the (B) pigment owing to intermolecular force such as an acid-base interaction, a hydrogen bond and a dipole-dipole interaction to be excellent in the absorptivity with the (B) pigment; accordingly, a stable dispersion is obtained. Furthermore, the (A) polyallylamine derivative is a high molecular compound having a specified repeating structural unit in a side chain; accordingly, the dispersion stability is obtained owing to the steric repulsion effect of the high molecular chains.

In the pigment composition or ink composition of the invention, a known pigment dispersant may be used together with the (A) polyallylamine derivative of the invention as long as it does not disturb the effect of the invention. An addition amount of the known pigment dispersant is preferably 50% by mass or less with respect to a content of the (A) polyallylamine derivative of the invention.

The ink composition of the invention is cured owing to a function of the (C) polymerizable compound when some energy is imparted. However, the ink composition is preferably a composition that further includes (D) a polymerization initiator and is cured by irradiation of an actinic energy ray.

Herein, the actinic energy ray is not limited to particular one as long as, when the actinic energy ray is irradiated, it may impart energy that generates an initiating species in an ink composition, and widely includes α-ray, γ-ray, X-ray, UV-ray, visible ray and electron beam. Among these, the actinic energy ray is preferably UV-ray or electron beam, and more preferably UV-ray, from the viewpoints of curing sensitivity and easy availability of an appratus. Accordingly, an ink composition that is cured by irradiating UV-ray is preferred as an ink composition of the invention.

In what follows, the respective compositions will be described.

<(B) Pigment>

The (B) pigment contained in the pigment composition or ink composition of the invention is not particularly limited and, depending on an object, all of commercially available organic and inorganic pigments and ones obtained by dying resin particles with a dye as well may be used. Furthermore, commercially available pigment dispersions and surface-treated pigments such as ones obtained by dispersing a pigment in an insoluble resin used as a dispersant or ones obtained by grafting a resin on a pigment surface may be used as long as these do not disturb the effects of the invention.

The pigment composition or ink composition of the invention contains a pigment as a colorant; accordingly, images obtained from the pigment composition or ink composition of the invention are excellent in the weather resistance.

Specific examples of the (B) pigment include organic pigments such as phthalocyanine pigments, insoluble azo pigments, azo lake pigments, anthraquinone pigments, quinacridone pigments, dioxazine pigments, diketopyrolopyrrole pigments, anthrapyrimidine pigments, anthanthrone pigments, indanthrone pigments, fravanthrone pigments, perinone pigments, perylene pigments, thioindigo pigments, and quinophthalone pigments.

Examples of the (B) pigment include the pigments described in Seijiro Itoh, "Dictionary of Pigments" (2000), W. Herbst and K. Hunger, "Industrial Organic Pigments", and JP-A Nos. 2002-12607, 2002-188025, 2003-26978, and 2003-342503, the disclosures of which are incorporated herein by reference.

Specific examples of the organic and inorganic pigments included in the pigment composition or the ink composition of the invention include the following. Examples of pigments of yellow color include: monoazo pigments such as C.I. Pigment Yellow 1 (Fast Yellow G, etc.) and C.I. Pigment Yellow 74; disazo pigments such as C.I. Pigment Yellow 12 (Disazo Yellow AAA, etc.), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155 and C.I. Pigment Yellow 219; non-benzidine azo pigments such as C.I. Pigment Yellow 180; azo lake pigments such as C.I. Pigment Yellow 100 (tartrazine yellow lake, etc.); condensation azo pigments such as C.I. Pigment Yellow 95 (Condensation Azo Yellow, etc.), C.I. Pigment Yellow 93, C.I. Pigment Yellow 94, C.I. Pigment Yellow 128 and C.I. Pigment Yellow 166; acidic dye lake pigments such as C.I. Pigment Yellow 115 (quinoline yellow lake, etc.); basic dye lake pigments such as C.I. Pigment Yellow 18 (thioflavin lake, etc.); anthraquinone pigments such as C.I. Pigment Yellow 24 (fravantrone yellow, etc.); quinophtharone pigments such as C.I. Pigment Yellow 110 (quinophtharone yellow, etc.); isoindoline pigments such as C.I. Pigment Yellow 139 (isoindoline yellow, etc.); pyrazolone pigments such as C.I. Pigment Yellow 60 (pyrazolone yellow, etc.); acetolone pigments such as C.I. Pigment Yellow 120, C.I. Pigment Yellow 154, C.I. Pigment Yellow 167, C.I. Pigment Yellow 151, C.I. Pigment Yellow 175, C.I. Pigment Yellow 180, C.I. Pigment Yellow 181 and C.I. Pigment Yellow 194; metal-complex-salt pigments such as C.I. Pigment Yellow 150; nitroso pigments such as C.I. Pigment Yellow 153 (nickel nitroso yellow, etc.); and metal-complex-salt azomethine pigments such as C.I. Pigment Yellow 117 (copper azomethine yellow, etc.).

Examples of red or magenta pigments include: monoazo pigments such as C.I. Pigment Red 3 (toluidine red, etc.); β-naphtol pigments such as C.I. Pigment Red 1, C.I. Pigment Red 4 and C.I. Pigment Red 6; disazo pigments such as C.I. Pigment Red 38 (Pyrazolone Red B, etc.); azolake pigments such as C.I. Pigment Red 53:1 (Lake Red C, etc.), C.I. Pigment Red 57:1 (Brilliant Carmine 6B, etc.), C.I. Pigment Red 52:1 and C.I. Pigment Red 48 (β-oxynaphthoic acid lake, etc.); condensation azo pigments such as C.I. Pigment Red 144, C.I. Pigment Red 166, C.I. Pigment Red 220, C.I. Pigment Red 214, C.I. Pigment Red 221, C.I. Pigment Red 242 (Condensation Azo Red, etc.); acidic dye lake pigments such as C.I. Pigment Red 174 (Phloxine B Lake, etc.) and C.I. Pigment Red 172 (erythrosine Lake, etc.); basic dye lake pigments such as C.I. Pigment Red 81 (Rhodamine 6G' Lake, etc.); anthraquinone pigments such as C.I. Pigment Red 177 (dianthraquinonyl red, etc.); thioindigo pigments such as C.I. Pigment Red 88 (Thioindigo Bordeaux, etc.); perinone pigments such as C.I. Pigment Red 194 (perinone red, etc.); perylene pigments such as C.I. Pigment Red 149, C.I. Pigment Red 179, C.I. Pigment Red 178, C.I. Pigment Red 190, C.I. Pigment Red 224 and C.I. Pigment Red 123; quinacridone pigments such as C.I. Pigment Violet 19 (unsubstituted quinacridone) and C.I. Pigment Red 122, C.I. Pigment Red 262, C.I. Pigment Red 207 and C.I. Pigment Red 209; isoindolinone pigments such as C.I. Pigment Red 180 (Isoindolinone Red 2BLT, etc.); alizarin lake pigments such as C.I. Pigment Red 83 (madder lake, etc.); naphtholone pigments such as C.I. Pigment Red 171, C.I. Pigment Red 175, C.I. Pigment Red 176, C.I. Pigment Red 185 and C.I. Pigment Red 208; naphtol AS-based lake pigments such as C.I. Pigment Red 247; naphtol AS pigments such as C.I. Pigment Red 2, C.I. Pigment Red 5, C.I. Pigment Red 21, C.I. Pigment Red 170, C.I. Pigment Red 187, C.I. Pigment Red 256, C.I. Pigment Red 268 and C.I. Pigment Red 269; diketopyrrolopyrrole pigments such as C.I. Pigment Red 254, C.I. Pigment Red 255, C.I. Pigment Red 264 and C.I. Pigment Red 272.

Examples of blue or cyan pigments include disazo pigments such as C.I. Pigment Blue 25 (dianisidine blue, etc.); phthalocyanine pigments such as C.I. pigment Blue 15, C.I. pigment Blue 15:1, C.I. pigment Blue 15:2, C.I. Pigment Blue 15:3, C.I. Pigment Blue 15:4, C.I. Pigment Blue 15:6 and C.I. Pigment Blue 16 (phthalocyanine blue, etc.); acidic dye lake pigments such as C.I. Pigment Blue 24 (peacock blue lake, etc.); basic dye lake pigments such as C.I. Pigment Blue 1 (Victoria Pure Blue BO Lake, etc.); anthraquinone pigments such as C.I. Pigment Blue 60 (indanthron blue, etc.); and alkali blue pigments such as C.I. Pigment Blue 18 (Alkali Blue V-5:1).

Examples of green pigments include phthalocyanine pigments such as C.I. Pigment Green 7 (phthalocyanine green) and C.I. Pigment Green 36 (phthalocyanine green); and azo metal complex pigments such as C.I. Pigment Green 8 and C.I. Pigment Green 10.

Examples of orange pigments include isoindoline pigments such as C. I. Pigment Orange 66 (isoindoline orange), anthraquinone pigments such as C. I. pigmment orange 51 (dichloropyrantholone orange), β-naphthol pigments such as C. I. Pigment Orange 2, C. I. Pigment Orange 3 and C. I. Pigment Orange 5, naphthol AS pigments such as C. I. Pigment Orange 4, C. I. Pigment Orange 22, C. I. Pigment Orange 24, C. I. Pigment Orange 38 and C. I. Pigment Orange 74, isoindolinone pigments such as C. I. Pigment Orange 61, perinone pigments such as C. I. Pigment Orange 43, disazo pigments such as C. I. Pigment Orange 15 and C. I. Pigment Orange 16, quinacridone pigments such as C. I. Pigment Orange 48 and C. I. Pigment Orange 49, acetolone pigments such as C. I. Pigment Orange 36, C. I. Pigment Orange 62, C. I. Pigment Orange 60, C. I. Pigment Orange 64 and C. I. Pigment Orange 72 and pyrazolone pigments such as C. I. Pigment Orange 13 and C. I. Pigment Orange 34.

Examples of brown pigments include naphtholone pigments such as C. I. Pigment Brown 25 and C. I. Pigment Brown 32.

Examples of violet pigments include naphtholone pigments such as C. I. Pigment Violet 32, perylene pigments such as C. I. Pigment Violet 29, naphthol AS pigments such as C. I. Pigment Violet 13, C. I. Pigment Violet 17 and C. I. Pigment Violet 50 and dioxazine pigments such as C. I. Pigment Violet 23 and C. I. Pigment Violet 37.

Examples of black pigments include carbon black, titanium black, indazine pigments such as C.I. Pigment Black 1 (aniline black), and perylene pigments such as C.I. Pigment Black 31 and C.I. Pigment Black 32.

Examples of white pigments include basic lead carbonate ($2PbCO_3Pb(OH)_2$, so-called silver white), zinc oxide (ZnO, so-called zinc white), titanium oxide ($TiO_2$, so-called titanium white), and strontium titanate ($SrTiO_3$, so-called titanium strontium white). The inorganic particles used for white pigment may be particles of a single substance or an oxide of, for example, silicon, aluminum, zirconium, or titanium, or composite particles with an organometallic compound or an organic compound.

Since titanium oxide has a lower specific gravity and a higher refractive index and is more stable chemically or physically as compared with other white pigments, titanium oxide has a greater masking and tinting strength as the (B) pigment and is further excellent in resistance to acid or alkali and other environmental factors. Thus, titanium oxide is preferably used as a white pigment. Of course, other white pigment (including white pigments other than those described above) may be used as required.

The pigment composition of the invention may be a pigment dispersion composition that contains a dispersion medium in which the (B) pigment is dispersed.

For dispersing the (B) pigment, dispersing devices such as a ball mill, a sand mill, an attriter, a roll mill, a jet mill, a homogenizer, a paint shaker, a kneader, an agitator, a Henschel mixer, a colloid mill, an ultrasonic wave homogenizer, a pearl mill and a wet jet mill may be used.

When the (B) pigment is dispersed, it is preferable to add the (A) polyallyamine derivative of the invention in advance.

When the (B) pigment is added, a synergist suitable for each of the (B) pigments may be used as a dispersing aid as required. The dispersing aid is preferably added in an amount of from 1 part to 50 parts by mass with respect to 100 parts by mass of the (B) pigment.

A dispersion medium is not particularly limited as long as it can disperse the (B) pigment. For instance, known solvents and (C) polymerizable compounds described below are cited, and these may be used singularly or in a combination of a plurality of them.

The ink composition of the invention is a radiation-curable ink and cured after the ink is applied on a recording medium. Accordingly, a mode where only the (C) polymerizable compound is used as a dispersion medium and other dispersion medium (such as solvent) is not used is preferred. When a solvent remains in a cured ink image, deterioration in physical properties of the ink image such as deterioration in solvent resistance due to aging may be caused. From the viewpoint like this, as the dispersion medium, the (C) polymerizable compound is used, among these, the (C) polymerizable compound lowest in the viscosity is selected preferably from the viewpoint of improvements in dispersion aptitude of the (B) pigment and handling property of the ink composition.

The smaller a volume average particle diameter of the (B) pigment in the pigment dispersion composition or ink composition is, the more excellent the color forming property is. Accordingly, the volume average particle diameter of the pigment used is preferably substantially in the range of from 0.01 µm to 0.4 µm and more preferably in the range of from 0.02 µm to 0.2 µm. The selection of the (B) pigment, a pigment dispersant and a dispersion medium and setting of dispersion conditions and filtering conditions are performed so that the maximum particle diameter of the (B) pigment in the pigment dispersion composition or ink composition may be 3 µm or less and preferably 1 µm or less. By controlling the particle diameter, clogging in a head nozzle is inhibited from occurring, and the storage stability of ink, the transparency of ink, and the curing sensitivity may be maintained.

The volume average particle diameter and maximum particle diameter of the (B) pigment in the pigment dispersion composition and ink composition are measured by a known measuring method. Specifically, the particle diameter may be measured by a centrifugal-sedimentation light-transmission method, an X-ray transmission method, a laser diffraction/scattering method, or a dynamic light scattering method.

Because the (A) polyallyamine derivative excellent in the dispersibility and stability is used in the invention, a uniform and stable dispersion is obtained even when a fine particle pigment is used. Furthermore, a sharp image excellent in the color forming property is formed by use of the ink composition of the invention, in which fine pigment particles small in the particle diameter are uniformly and stably dispersed owing to a function of the (A) polyallyamine derivative of the invention.

In the case of pigment dispersion composition, when the (B) pigment is an organic pigment, a content of the (B) pigment is preferably from 1% to 50% by mass and more preferably from 5% to 40% by mass based on a solid content. When the (B) pigment is an inorganic pigment, a content of the (B) pigment is preferably from 1% to 70% by mass and more preferably from 10% to 60% by mass based on a solid content.

In the case of ink composition, when the (B) pigment is an organic pigment, a content of the (B) pigment is preferably from 1% to 20% by mass and more preferably from 2% to 10% by mass based on a solid content. When the (B) pigment is an inorganic pigment, a content of the (B) pigment in the ink composition is preferably from 1% to 30% by mass and more preferably from 2% to 25% by mass based on a solid content.

<(C) Polymerizable Compound>

An ink composition in the present invention includes (C) a polymerizable compound as described above. Any polymerizable compound may be used as the (C) polymerizable compound to be used in the invention without any particular limitation insofar as it causes a polymerization reaction and is cured by supplying some energy. Though a monomer, oligomer and polymer may be used regardless of type, various known polymerizable monomers known as a photo-cationic polymerizable monomer or photo-radical polymerizable monomer is preferable which causes a polymerization reaction by an initiator species generated from the (D) polymerization initiator which is added as desired. The (D) polymerization initiator will be described below. The (C) polymerizable compounds may be used either alone or in a combination of two or more of them with the intention of regulating reaction rate, physical properties of ink and physical properties of a cured film. Also, the polymerizable compounds may be either a monofunctional compound or a multifunctional compound.

Examples of cationic polymerizable monomers usable as the (C) polymerizable compound include the epoxy compounds, vinyl ether compounds, and oxetane compounds described in JP-A No. 6-9714, JP-A No. 2001-31892, JP-A No. 2001-40068, JP-A No. 2001-55507, JP-A No. 2001-310938, JP-A No. 2001-310937 and JP-A No. 2001-220526.

Examples of monofunctional epoxy compounds usable as the cationic polymerizable monomers include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Examples of multifunctional epoxy compounds usable as the cationic polymerizable monomers include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-metha-dioxane, bis(3,4-epoxycyclohexylmethyl)adipate, vinylcyclohexene oxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexane carboxylate, methylenebis(3,4-epoxycyclohexane), dicylopentadiene diepoxide, ethylene glycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Among these epoxy compounds, aromatic epoxides and alicyclic epoxides are preferable since they are advantageous in respect of the curing rate. Alicyclic epoxides are more preferable.

Examples of monofunctional vinyl ethers usable as the cationic polymerizable monomers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-(hydroxymethyl)cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Examples of multifunctional vinyl ethers usable as the cationic polymerizable monomers include: divinyl ethers such as ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and multifunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

Among the multifunctional vinyl ether compounds described above, a di- or trivinyl ether compound is preferable, and a divinyl ether compound is more preferable, from the viewpoint of curability, adhesion to a recording medium, and the surface hardness of an image formed.

The oxetane compound usable as the cationic polymerizable monomer refers to a compound having an oxetane ring. Such an oxetane compound may be selected arbitrarily from known oxetane compounds such as described in JP-A No. 2001-220526, JP-A No. 2001-310937, and JP-A No. 2003-341217. The compound having an oxetane ring usable in the ink composition of the invention is preferably a compound having 1 to 4 oxetane rings in its structure. By using such a compound, the viscosity of the ink composition can be easily maintained in a range which enables excellent handling property, and the ink after curing adheres strongly to the recording medium.

Examples of monofunctional oxetanes usable as the cationic polymerizable monomers include 3-ethyl-3-(hydroxymethyl)oxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl (3-ethyl-3-oxetanylmethyl)ether, isobornyloxyethyl(3-ethyl-3-oxetanylmethyl)ether, isobornyl (3-ethyl-3-oxetanylmethyl)ether, 2-ethylhexyl (3-ethyl-3-oxetanylmethyl)ether, ethyldiethylene glycol (3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl) ether, tetrabromophenyl (3-ethyl-3-oxetanylmethyl)ether, 2-tetrabromophenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl)ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, and bornyl(3-ethyl-3-oxetanylmethyl) ether.

Examples of multifunctional oxetanes usable as the cationic polymerizable monomers include 3,7-bis(3-oxetanyl)-5-oxa-nonane, 3,3'-(1,3-(2-methylenyl)propanediylbis (oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis (3-ethyl-3-oxetanylmethyl)ether, EO-modified hydrogenated bisphenol A bis(3-ethyl-3-oxetanylmethyl) ether, PO-modified hydrogenated bisphenol A bis(3-ethyl-3-oxetanylmethyl)ether, and EO-modified bisphenol F (3-ethyl-3-oxetanylmethyl)ether.

Such compounds having oxetane rings are described in detail in columns [0021] to [0084] of JP-A No. 2003-341217 supra, and the compounds described therein can be preferably used in the present invention as well.

Among the oxetane compounds as the cationic polymerizable monomer, a compound having one or two oxetane rings is preferable from the viewpoints of the viscosity and tackiness of the ink composition.

In the ink composition of the invention, only one polymerizable compound may be used, or two or more polymerizable compounds may be used as the cationic polymerizable monomer. From the viewpoint of effective suppression of shrinkage upon curing of ink, it is preferable to use a combination of at least one oxetane compound and at least one compound selected from epoxy compounds and vinyl ether compounds.

In the invention, the (C) polymerizable compound may be selected from a wide variety of known radical polymerizable monomers that undergo polymerization reaction in the presence of an initiator species generated from a photo-radical initiator.

Examples of such radical polymerizable monomers include (meth)acrylates, (meth)acrylamides, and aromatic vinyls. In the specification, the term "(meth)acrylate" is occasionally used to mean "acrylate" and/or "methacrylate", and the term "(meth)acryl" is occasionally used to mean "acryl" and/or "methacryl".

Examples of (meth)acrylates usable as the radical polymerzable monomers include mono functional (meth)acrylates, bifunctional (meth)acrylates, trifunctional (meth)acrylates, tetrafunctional (meth)acrylates, heptafunctional (meth) acrylates, and hexafunctional (meth)acrylates.

Examples of monofunctional (meth)acrylates include hexyl (meth)acrylate, 2-ethylhexyl(meth)acrylate, tert-octyl (meth)acrylate, isoamyl(meth)acrylate, decyl(meth)acrylate, isodecyl(meth)acrylate, stearyl(meth)acrylate, isostearyl (meth)acrylate, cyclohexyl(meth)acrylate, 4-n-butylcyclohexyl(meth)acrylate, bornyl(meth)acrylate, isobornyl(meth) acrylate, benzyl(meth)acrylate, 2-ethylhexyl diglycol(meth) acrylate, butoxyethyl(meth)acrylate, 2-chloroethyl(meth) acrylate, 4-bromobutyl(meth)acrylate, cyanoethyl(meth) acrylate, benzyl(meth)acrylate, butoxymethyl(meth) acrylate, 3-methoxybutyl(meth)acrylate, alkoxymethyl (meth)acrylate, alkoxyethyl(meth)acrylate, 2-(2-methoxyethoxy)ethyl (meth)acrylate, 2-(2-butoxyethoxy) ethyl (meth)acrylate, 2,2,2-tetrafluoroethyl(meth)acrylate, 1H,1H,2H,2H-perfluorodecyl(meth)acrylate, 4-butylphenyl (meth)acrylate, phenyl(meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth) acrylate, tetrahydrofurfuryl(meth)acrylate, hydroxyalkyl (meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxybutyl(meth)acrylate, dimethylaminoethyl (meth)acrylate, diethylaminoethyl(meth)acrylate, dimethylaminopropyl (meth)acrylate, diethylaminopropyl(meth) acrylate, trimethoxysilylpropyl(meth)acrylate, trimethylsilylpropyl(meth)acrylate, polyethylene oxide monomethyl ether(meth)acrylate, oligoethylene oxide monomethyl ether(meth)acrylate, polyethylene oxide(meth) acrylate, oligoethylene oxide(meth)acrylate, oligoethylene oxide monoalkyl ether(meth)acrylate, polyethylene oxide monoalkyl ether(meth)acrylate, dipropylene glycol(meth) acrylate, polypropylene oxide monoalkyl ether(meth)acrylate, oligopropylene oxide monoalkyl ether(meth)acrylate, 2-methacryloyloxyethylsuccinic acid, 2-methacryloyloxyhexahydrophthalic acid, 2-methacryloyloxyethyl-2-hydroxypropyl phthalate, butoxyethylene glycol(meth)acrylate, trifluoroethyl(meth)acrylate, perfluorooctylethyl(meth) acrylate, 2-hydroxy-3-phenoxypropyl (meth)acrylate, EO-modified phenol(meth)acrylate, EO-modified cresol (meth)acrylate, EO-modified nonylphenol(meth)acrylate, PO-modified nonylphenol(meth)acrylate, EO-modified 2-ethylhexyl(meth)acrylate, dicyclopentenyl(meth)acrylate, and dicyclopentanyl(meth)acrylate.

Examples of bifunctional (meth)acrylates include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropanediol(meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, neopentyl glycol propyleneoxy di(meth)acrylate, dipropylene glycol di(meth)acrylate, and propoxylated neopentyl glycol di(meth)acrylate.

Examples of trifunctional (meth)acrylates include trimethylolpropane tri(meth)acrylate, trimethylolethane tri (meth)acrylate, trimethylolpropane alkylene oxide-modified tri(meth)acrylate, pentaerythritol tri(meth)acrylate, dipentaerythritol tri(meth)acrylate, trimethylolpropane tri((meth) acryloyloxypropyl)ether, isocyanuric acid alkylene oxide-modified tri(meth)acrylate, propionic acid dipentaerythritol tri(meth)acrylate, tri((meth)acryloyloxyethyl)isocyanurate, hydroxypival aldehyde-modified dimethylolpropane tri (meth)acrylate, sorbitol tri(meth)acrylate, propoxylated trimethylolpropane tri(meth)acrylate, and ethoxylated glycerin triacrylate.

Examples of tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Examples of pentafunctional (meth)acrylates include sorbitol penta(meth)acrylate and dipentaerythritol penta(meth) acrylate.

Examples of hexafunctional (meth)acrylates include dipentaerythritol hexa(meth)acrylate, sorbitol hexa(meth) acrylate, phosphazene alkylene oxide-modified hexa(meth) acrylate, and caprolactone-modified dipentaerythritol hexa (meth)acrylate.

Examples of (meth)acrylamides usable as the radical polymerizable monomers include (meth)acrylamide, N-methyl (meth)acrylamide, N-ethyl(meth)acrylamide, N-propyl (meth)acrylamide, N-n-butyl(meth)acrylamide, N-t-butyl (meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth) acrylamide, and (meth)acryloyl morpholine.

Examples of aromatic vinyls usable as the radical polymerizable monomers include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene.

Examples of the radical polymerizable monomer usable in the invention include vinyl lactams [N-vinyl caprolactam, N-vinyl pyrrolidone etc.], vinyl esters [vinyl acetate, vinyl propionate, vinyl versate etc.], allyl esters [allyl acetate etc.], halogen-containing monomers [vinylidene chloride, vinyl chloride etc.], vinyl ethers [methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, triethylene glycol divinyl ether etc.] and vinyl cyanides [(meth)acrylonitrile etc.], and olefins [ethylene, propylene etc.].

Among these, the radical polymerizable monomer in the invention is preferably a (meth)acrylate or a vinyl lactam from the viewpoint of the curing rate, and particularly preferably a tetrafunctional or higher-functional (meth)acrylate from the viewpoint of the curing rate. From the viewpoint of the viscosity of the ink composition, it is preferable to use a combination of a multifunctional (meth)acrylate such as described above and a monofunctional or bifunctional (meth) acrylate or a vinyl lactam.

The content of the (C) polymerizable compound in the ink composition is preferably from 50% by mass to 95% by mass, more preferably from 60% by mass to 92% by mass, and still more preferably from 70% by mass to 90% by mass, with respect to the total solid content of the composition.

The ink composition of the invention may contain various additives in accordance with the object in addition to the indispensable components. The arbitrary components will be described.

<(D) Polymerization Initiator>

The ink composition of the invention preferably contains (D) a polymerization initiator for radical polymerization or a cationic polymerization, and more preferably contains a photopolymerization initiator.

The photopolymerization initiator in the invention is a compound that is changed chemically through the action of light and an interaction with a sensitizing dye put in an electron excited state to produce at least one of a radical, an acid or a base.

The (D) polymerization initiator may be selected appropriately from initiators having sensitivity to the actinic ray and the like for irradiation, such as UV ray in the wavelength region of from 400 nm to 200 nm, far UV ray, g-line, h-line, i-line, KrF excimer laser beam, ArF excimer laser beam, electron ray, X-ray, molecular beam, or ion beam.

Specifically, any of common photopolymerization initiators known in the art may be used. Specific examples thereof described, for example, in Bruce M. Monroe et al., Chemical Revue, 93, 435 (1993); R, S. Davidson, Journal of Photochemistry and biology, A: Chemistry, 73, 81 (1993); J. P. Faussier, "Photoinitiated Polymerization-Theory and Applications": Rapra Review vol. 9, Report, Rapra Technology (1998); and M. Tsunooka et al., Prog. Polym. Sci., 21, 1 (1996), the disclosures of which are incorporated herein by reference, may be used in the invention. Compounds favorably used in chemical-amplification photoresists and for photocationic polymerization described in Japanese Research Association for Organic Electronics Materials Ed., "Organic Materials for Imaging" (published by Bun-Shin Shuppan (1993), pages. 187 to 192), the disclosure of which is incorporated herein by reference, may be also used in the invention. The compounds that undergo oxidative or reductive bond cleavage through the interaction with the electronically-excited state of sensitizing dye are also known, and described, for example in F. D. Saeva, Topics in Current Chemistry, 156, 59 (1990); G. G. Maslak, Topics in Current Chemistry, 168, 1 (1993); H. B. Shuster et al., JACS, 112, 6329 (1990); I. D. F. Eaton et al., JACS, 102, 3298 (1980), the disclosures of which are incorporated herein by reference.

Examples of such photopolymerization initiators include aromatic ketones (i), aromatic onium salt compounds (ii), organic peroxides (iii), hexaarylbiimidazole compounds (iv), ketoxime ester compounds (v), borate compounds (vi), azinium compounds (vii), metallocene compounds (viii), active ester compounds (ix), and compounds having a carbon-halogen bond (x).

An acylphosphineoxide compound may be also usable as the photopolymerization initiator in the present invention.

Examples of the aromatic ketones (i) include preferably the compounds each having a benzophenone or thioxanthone skeleton described in "Radiation Curing in Polymer Science and Technology" J. P. Fouassier and J. F. Rabek (1993), pages. 77 to 117, the disclosure of which is incorporated herein by reference. Examples of the aromatic ketones (i) include more preferably the α-thio benzophenone compounds described in JP-B No. 47-6416 (the disclosure of which is incorporated herein by reference); the benzoin ether compounds described in JP-B No. 47-3981 (the disclosure of which is incorporated herein by reference); the α-substituted benzoin compounds described in JP-B No. 47-22326 (the disclosure of which is incorporated herein by reference); the benzoin derivatives described in JP-B No. 47-23664 (the disclosure of which is incorporated herein by reference); the aroyl phosphonic acid esters described in JP-A No. 57-30704 (the disclosure of which is incorporated herein by reference); the dialkoxybenzophenones described in JP-B No. 60-26483 (the disclosure of which is incorporated herein by reference); the benzoin ethers described in JP-B No. 60-26403 and JP-A No. 62-81345 (the disclosures of which are incorporated herein by reference); the α-aminobenzophenones described in JP-B No. 1-34242, U.S. Pat. No. 4,318,791, and EP Patent No. 0284561A1 (the disclosures of which are incorporated herein by reference); p-di(dimethylaminobenzoyl)benzene described in JP-A No. 2-211452 (the disclosure of which is incorporated herein by reference); the thio-substituted aromatic ketones described in JP-A No. 61-194062 (the disclosure of which is incorporated herein by reference); the acylphosphine sulfides described in JP-B No. 2-9597 (the disclosure of which is incorporated herein by reference); the acylphosphines described in JP-B No. 2-9596 (the disclosure of which is incorporated herein by reference); the thioxanthones described in JP-B No. 63-61950 (the disclosure of which is incorporated herein by reference); and the coumarins described in JP-B No. 59-42864 (the disclosure of which is incorporated herein by reference).

Examples of the aromatic onium salt compounds (ii) include aromatic onium salts including the elements in Groups V, VI or VII in the periodic table, specifically, aromatic onium salts of N, P, As, Sb, Bi, O, S, Se, Te, or I. Preferable examples thereof include the iodonium salts described in EP Patent No. 104143, U.S. Pat. No. 4,837,124, and JP-A Nos. 2-150848 and 2-96514 (the disclosures of which are incorporated herein by reference); the sulfonium salts described in EP Patent Nos. 370693, 233567, 297443, 297442, 279210, and 422570 and U.S. Pat. Nos. 3,902,144, 4,933,377, 4,760,013, 4,734,444, and 2,833,827 (the disclosures of which are incorporated herein by reference); diazonium salts (e.g., benzenediazonium salts which may have a substituent); diazonium salt resins (e.g., formaldehyde resins of diazodiphenylamine); N-alkoxypyridinium salts (e.g., those described in U.S. Pat. No. 4,743,528, JP-A Nos. 63-138345, 63-142345, and 63-142346, and JP-B No. 46-42363 (the disclosures of which are incorporated herein by reference), and specifically, 1-methoxy-4-phenylpyridinium tetrafluoroborate, etc.); and the compounds described in JP-B Nos. 52-147277, 52-14278, and 52-14279 (the disclosures of which are incorporated herein by reference). The aromatic onium salt compound (ii) generates a radical or an acid as an active species.

Examples of the organic peroxides (iii) include almost all organic compounds having one or more oxygen-oxygen bonds in the molecule; and preferable examples thereof include peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl) benzophenone, 3,3',4,4'-tetra-(t-octylperoxycarbonyl) benzophenone, 3,3',4,4'-tetra-(cumylperoxycarbonyl) benzophenone, 3,3',4,4'-tetra-(p-isopropylcumylperoxycarbonyl)benzophenone, and di-t-butyl diperoxyisophthalate.

Examples of the hexaarylbiimidazole compounds (iv) include the Rofin dimers described in JP-B Nos. 45-37377 and 44-86516, such as 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o-, p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o-, o'-dichlorophenyl)-4,4',5,5'-tetraphenylbiimidazole, 2,2'-bis (o-nitrophenyl)-4,4',5,5'-tetraphenylbiimidazole, 2,2'-bis(o-methylphenyl)-4,4',5,5'-tetraphenylbiimidazole, and 2,2'-bis (o-trifluorophenyl)-4,4',5,5'-tetraphenylbiimidazole.

Examples of the ketoxime ester compounds (v) include 3-benzoyloxyiminobutan-2-one, 3-acetoxyiminobutan-2-one, 3-propionyloxyiminobutan-2-one, 2-acetoxyiminopentane-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compounds (vi) include the compounds described in U.S. Pat. Nos. 3,567,453 and 4,343,891, and EP Patent No. 109,772 and 109,773 (the disclosures of which are incorporated herein by reference).

Examples of the azinium compounds (vii) include the compounds containing an N—O bond described in JP-A Nos. 63-138345, 63-142345, 63-142346, and 63-143537, and JP-B No. 46-42363, the disclosures of which are incorporated herein by reference.

Examples of the metallocene compounds (viii) include the titanocene compounds described in JP-A Nos. 59-152396, 61-151197, 63-41484, 2-249, and 2-4705 (the disclosures of which are incorporated herein by reference) and the iron-allene complexes described in JP-A Nos. 1-304453 and 1-152109 (the disclosures of which are incorporated herein by reference).

Specific examples of the titanocene compounds include dicyclopentadienyl-Ti-dichloride, dicyclopentadienyl-Ti-bisphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyr-1-yl)phenyl) titanium, bis(cyclopentadienyl)bis[2,6-difluoro-3-(methyl sulfonamide)phenyl]titanium, and bis(cyclopentadienyl)bis [2,6-difluoro-3-(n-butylbiaroyl-amino)phenyl]titanium.

Examples of the active ester compounds (ix) include the nitrobenzylester compounds described in EP Patent Nos. 0290750, 046083, 156153, 271851, and 0388343, U.S. Pat. Nos. 3,901,710 and 4,181,531, and JP-A Nos. 60-198538 and 53-133022 (the disclosures of which are incorporated herein by reference); the iminosulfonate compounds described in EP Patent Nos. 0199672, 84515, 199672, 044115, and 0101122, U.S. Pat. Nos. 4,618,564, 4,371,605 and 4,431,774, and JP-A Nos. 64-18143, 2-245756, and 4-365048 (the disclosures of which are incorporated herein by reference); and the compounds described in JP-B Nos. 62-6223 and 63-14340, and JP-A No. 59-174831 (the disclosures of which are incorporated herein by reference).

Preferable examples of the compounds (x) having a carbon-halogen bond include the compounds described in Wakabayashi et al., Bull. Chem. Soc, Japan, 42, 2924 (1969) (the disclosure of which is incorporated herein by reference); the compounds described in British Patent No. 1388492 (the disclosure of which is incorporated herein by reference); the compounds described in JP-A No. 53-133428 (the disclosure of which is incorporated herein by reference); and the compounds described in German Patent No. 3337024 (the disclosure of which is incorporated herein by reference).

Further examples of the compound having a carbon-halogen bond include the compounds described in F. C. Schaefer et al., J. Org. Chem. 29, 1527 (1964) (the disclosure of which is incorporated herein by reference); the compounds described in JP-A No. 62-58241 (the disclosure of which is incorporated herein by reference); the compounds described in JP-A No. 5-281728 (the disclosure of which is incorporated herein by reference); as well as the compounds described in German Patent No. 2641100 (the disclosure of which is incorporated herein by reference); the compounds described in German Patent No. 3333450 (the disclosure of which is incorporated herein by reference); the compounds described in German Patent No. 3021590 (the disclosure of which is incorporated herein by reference); and the compounds described in German Patent No. 3021599 (the disclosure of which is incorporated herein by reference).

Preferable specific examples of the compounds represented by (i) to (x) are shown below:

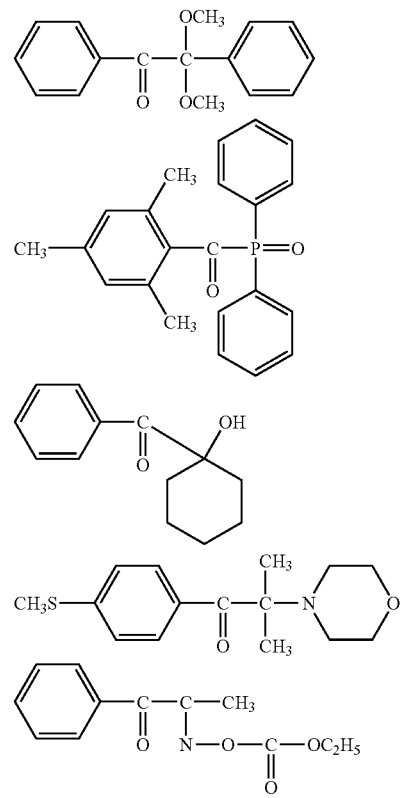

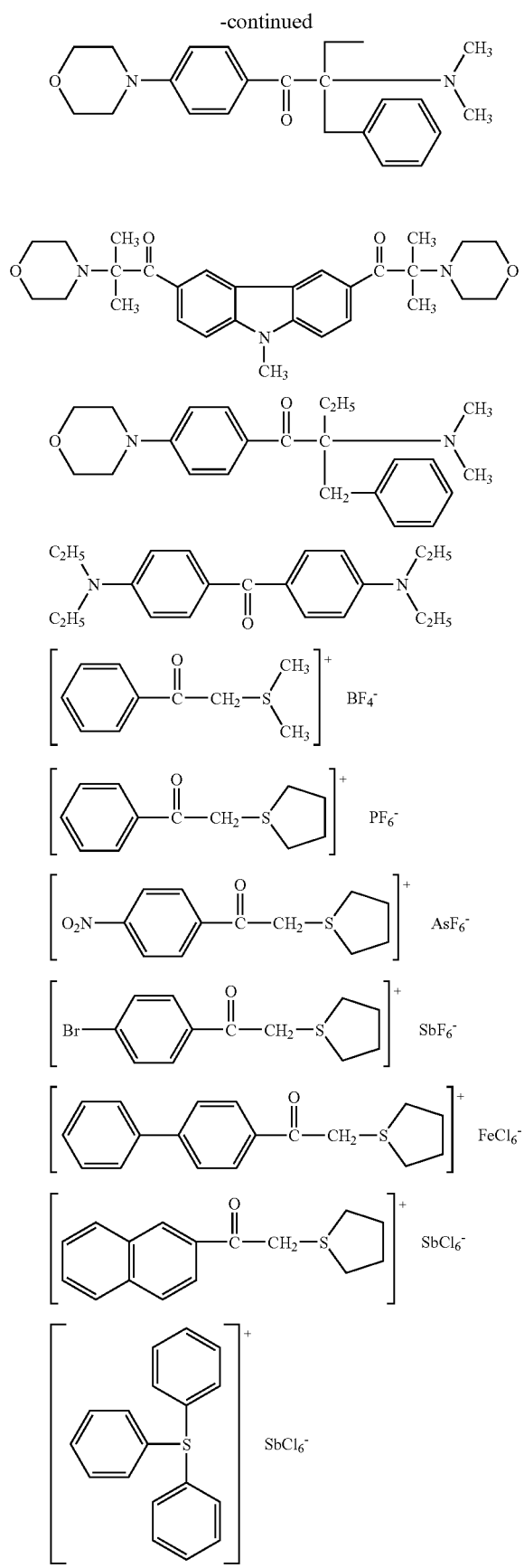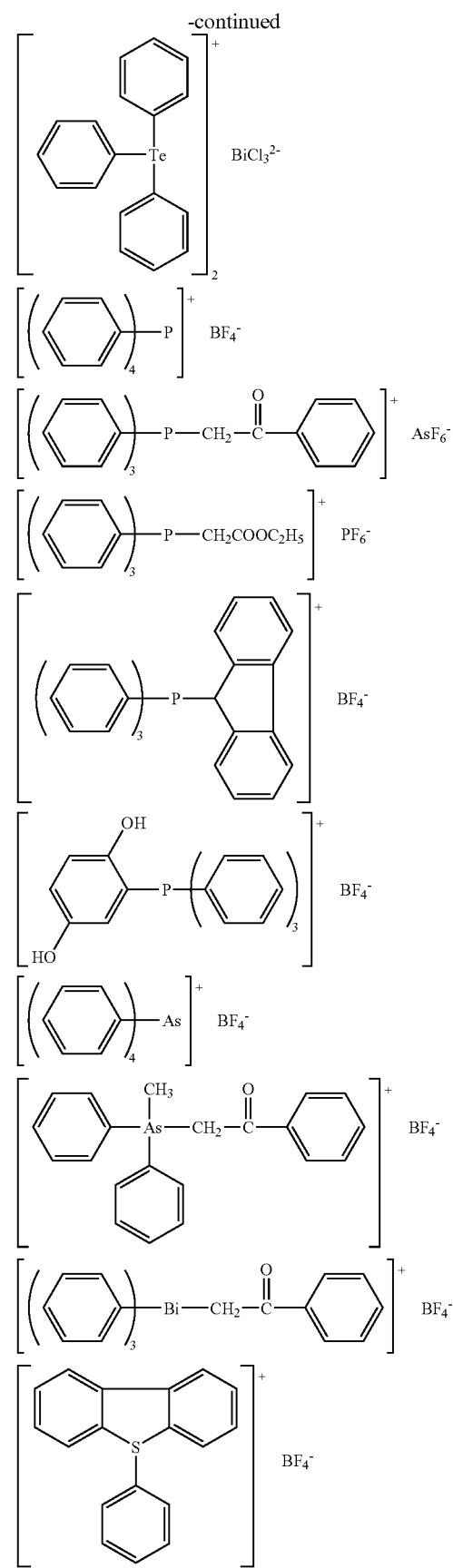

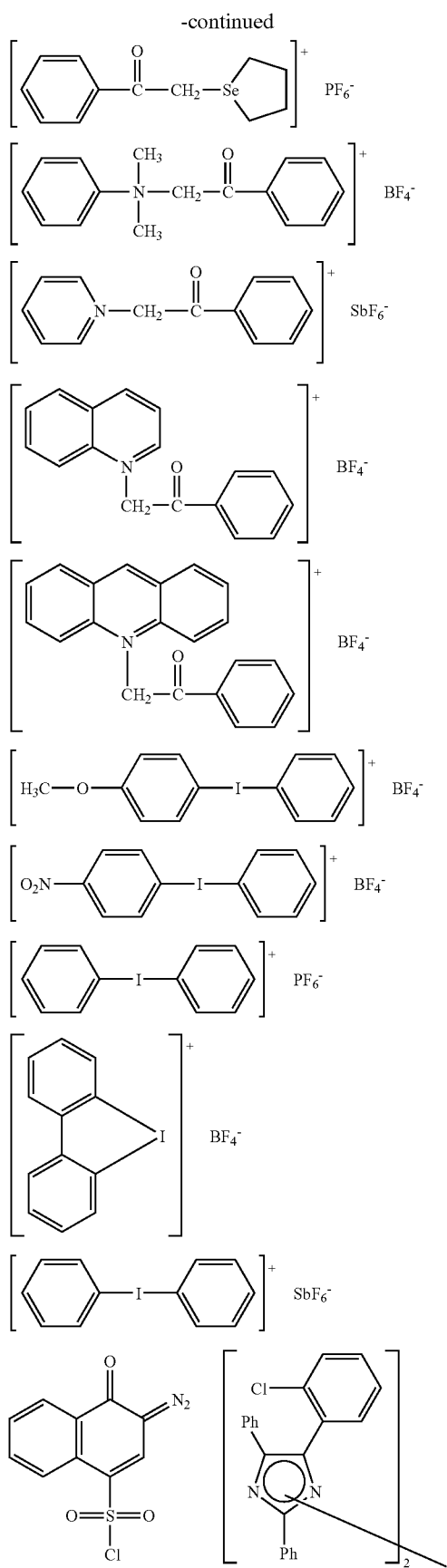
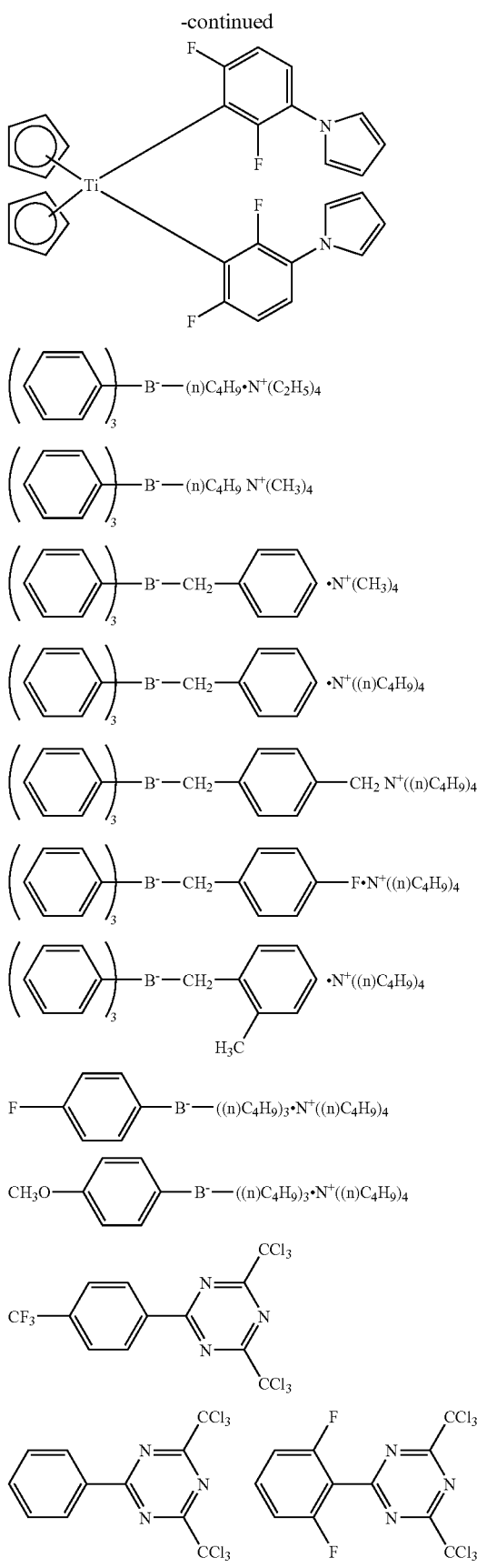

-continued

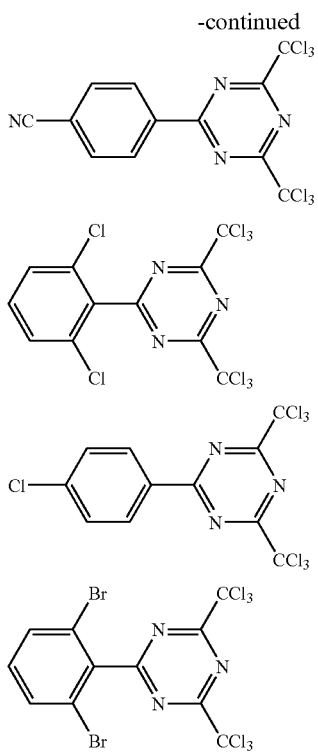

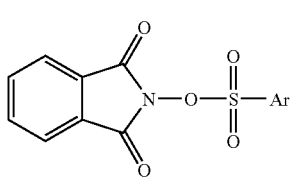

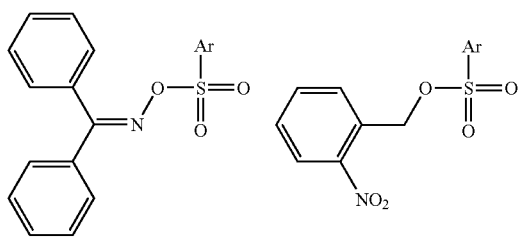

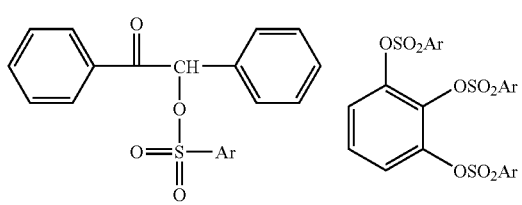

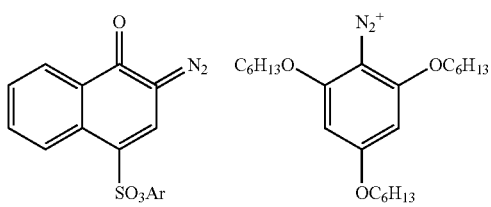

-continued

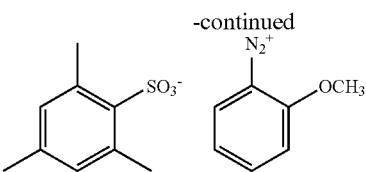

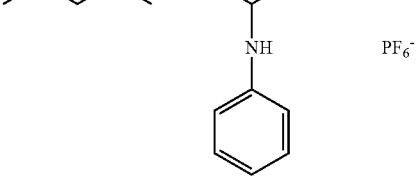

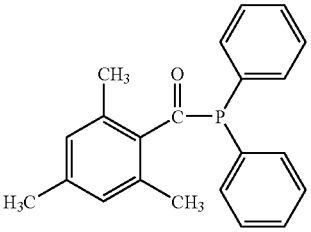

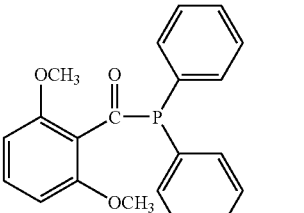

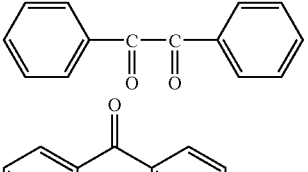

Only one photopolymerization initiator may be used, or two or more photopolymerization initiators may be used in combination.

The content of the photopolymerization initiator in the ink composition is preferably from 0.1% by mass to 20% by mass, more preferably from 0.5% by mass to 10% by mass, still more preferably from 1% by mass to 7% by mass, with respect to the total mass of the ink composition.

<Other Components>

—Sensitizing Dye—

In the invention, a sensitizing dye may be added for the purpose of improving the sensitivity of the photopolymerization initiator. Preferable examples of the sensitizing dye include those belonging to the following compound classes and having absorption wavelengths in the region of from 350 nm to 450 nm: multinuclear aromatics (e.g., pyrene, perylene, and triphenylene), xanthenes (e.g., fluorescein, eosin, erythrosine, rhodamine B, and Rose Bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acryflavin), anthraquinones (e.g., anthraquinone), squaliums (e.g., squalium), coumarins (e.g., 7-diethylamino-4-methylcoumarin).

Preferable examples of the sensitizing dye include compounds represented by the following formulae (IX) to (XIII).

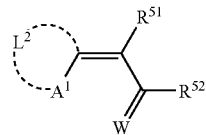

Formula (IX)

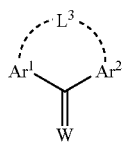

Formula (X)

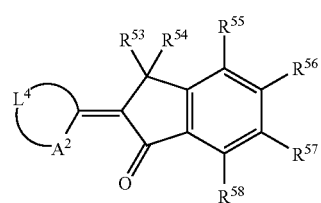

Formula (XI)

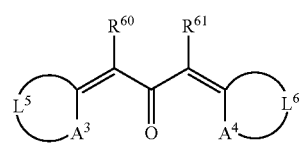

Formula (XII)

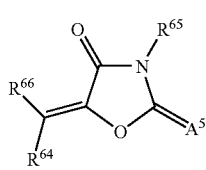

Formula (XIII)

In Formula (IX), $A^1$ represents a sulfur atom or —$NR^{50}$—, $R^{50}$ represents an alkyl group or an aryl group, $L^2$ represents a nonmetallic atomic group which, together with $A^1$ and a carbon atom adjacent thereto, forms a basic nucleus of a dye, $R^{51}$ and $R^{52}$ each independently represent a hydrogen atom or a monovalent nonmetallic atomic group, $R^{51}$ and $R^{52}$ may bond to each other to form an acidic nucleus of a dye, and W represents an oxygen atom or a sulfur atom.

In formula (X), $Ar^1$ and $Ar^2$ each independently represent an aryl group, and link together via a linkage -$L^3$- which represents —O— or —S—. W has the same meaning as in formula (IX).

In formula (XI), $A^2$ represents a sulfur atom or $NR^{59}$, and $L^4$ represents a nonmetallic atomic group which, together with $A^2$ and a carbon atom adjacent thereto, forms a basic nucleus of a dye, $R^{53}$, $R^{54}$, $R^{55}$, $R^{56}$, $R^{57}$ and $R^{58}$ each independently represent a monovalent nonmetallic atomic group, and $R^{59}$ represents an alkyl group or an aryl group.

In formula (XII), $A^3$ and $A^4$ each independently represent —S—, —$NR^{62}$ or —$NR^{63}$—. $R^{62}$ and $R^{63}$ each independently represent a substituted or unsubstituted alkyl group or a substituted or unsubstituted aryl group. $L^5$ represent a nonmetallic atomic group which, together with $A^3$ and the carbon atom adjacent thereto, forms a basic nucleus of a dye. $L^6$ represent a nonmetallic atomic group which, together with $A^4$ and a carbon atom adjacent thereto, forms a basic nucleus of a dye. $R^{60}$ and $R^{61}$ each independently represent a hydrogen atom or a monovalent nonmetallic atomic group, $R^{60}$ and $R^{61}$ may bond to each other to form an aliphatic or aromatic ring.

In formula (XIII), $R^{66}$ represents an aromatic ring or heterocycle which may have a substituent, $A^5$ represents an oxygen atom, a sulfur atom, or —$NR^{67}$—. $R^{64}$, $R^{65}$, and $R^{67}$ each independently represent a hydrogen atom or a monovalent nonmetallic atomic group. $R^{67}$ and $R^{64}$ may be bonded to each other to form an aliphatic or aromatic ring. $R^{65}$ and $R^{67}$ may be bonded to each other to form an aliphatic or aromatic cycle.

Preferable examples of the compounds represented by formulae (IX) to (XIII) include exemplary compounds (A-1) to (A-20) shown below:

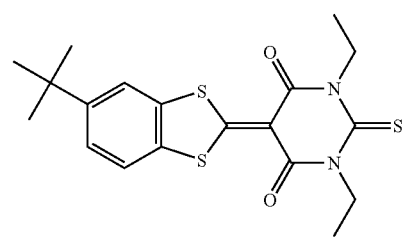

(A-1)

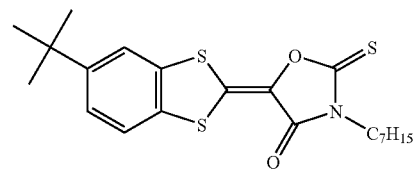

(A-2)

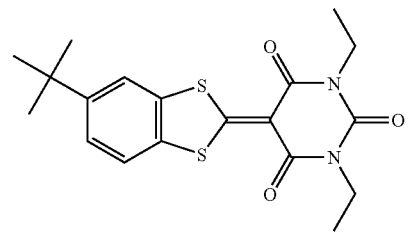

(A-3)

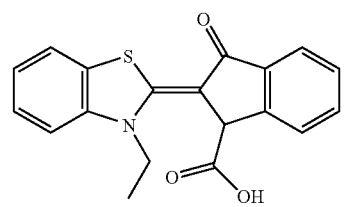

(A-4)

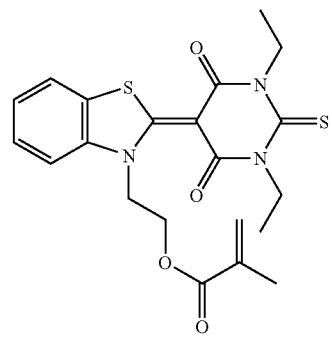

(A-5)

-continued

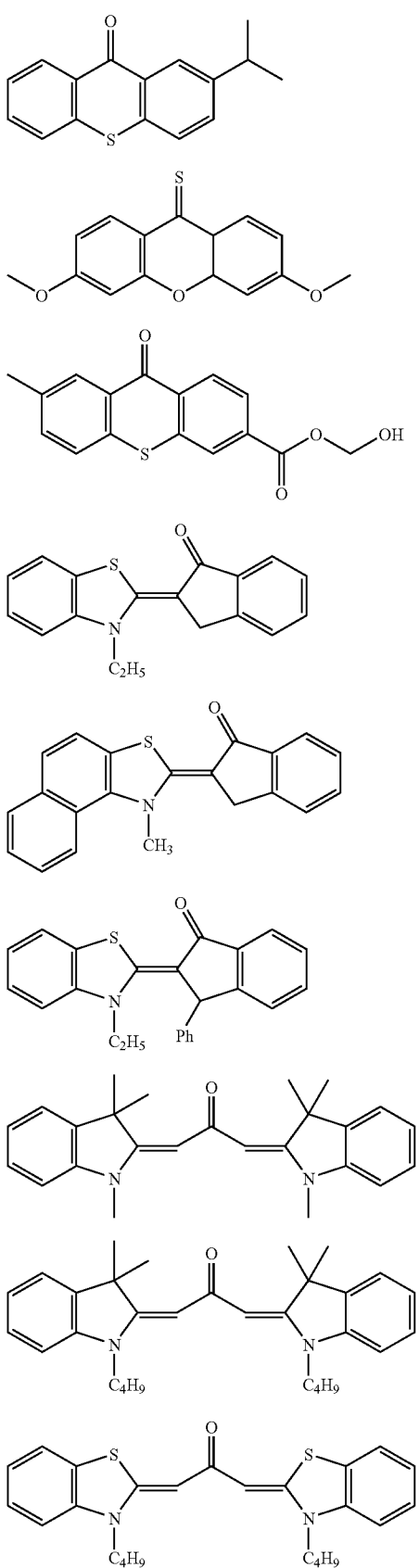

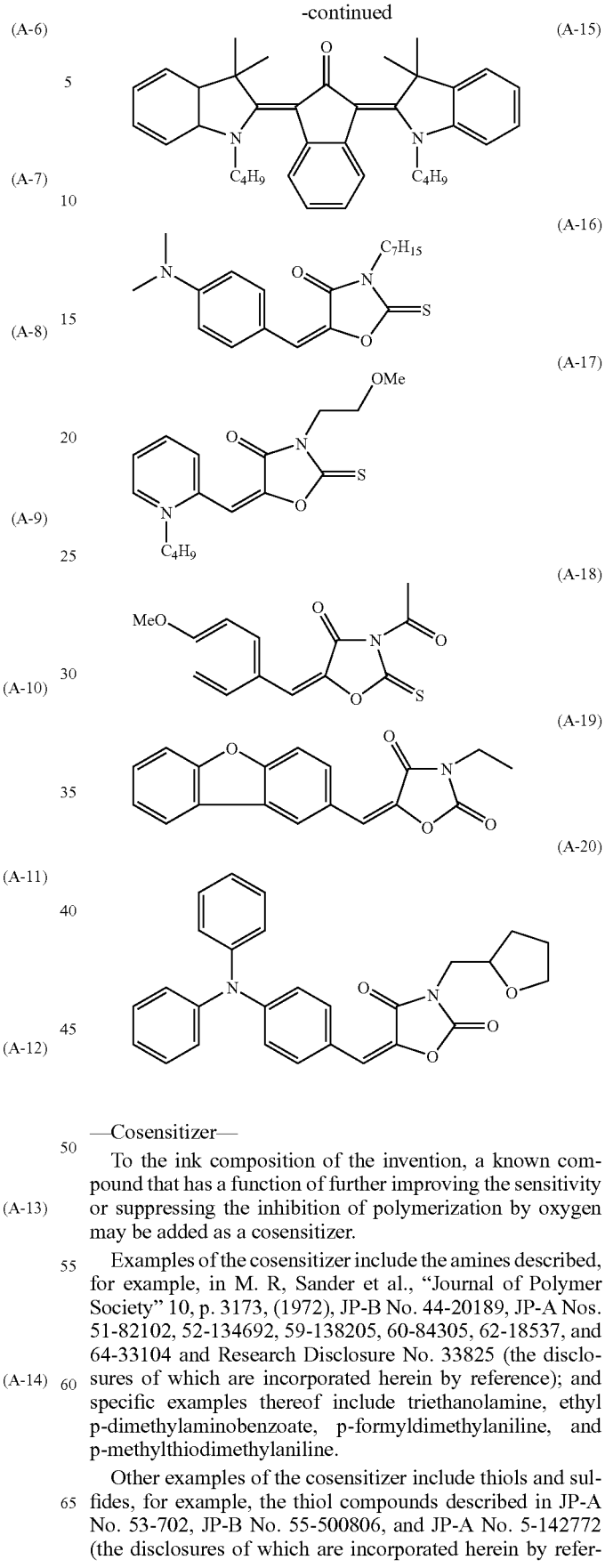

—Cosensitizer—

To the ink composition of the invention, a known compound that has a function of further improving the sensitivity or suppressing the inhibition of polymerization by oxygen may be added as a cosensitizer.

Examples of the cosensitizer include the amines described, for example, in M. R, Sander et al., "Journal of Polymer Society" 10, p. 3173, (1972), JP-B No. 44-20189, JP-A Nos. 51-82102, 52-134692, 59-138205, 60-84305, 62-18537, and 64-33104 and Research Disclosure No. 33825 (the disclosures of which are incorporated herein by reference); and specific examples thereof include triethanolamine, ethyl p-dimethylaminobenzoate, p-formyldimethylaniline, and p-methylthiodimethylaniline.

Other examples of the cosensitizer include thiols and sulfides, for example, the thiol compounds described in JP-A No. 53-702, JP-B No. 55-500806, and JP-A No. 5-142772 (the disclosures of which are incorporated herein by reference), and the disulfide compounds described in JP-A No. 56-75643 (the disclosure of which is incorporated herein by reference); and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g., N-phenylglycine), the organic metal compounds described in JP-B No. 48-42965 (e.g., tributyltin acetate), the hydrogen donors described in JP-B No. 55-34414, the sulfur compounds described in JP-A No. 6-308727 (e.g., trithiane), the phosphorus compounds described in JP-A No. 6-250387 (e.g., diethyl phosphite), and the Si—H and Ge—H compounds described in JP-A No. 8-65779.

In addition to the essential components of (A) a polyallylamine derivative, (B) a pigment and (C) a polymerizable compound, (D) a polymerization initiator which is preferable optional component, and a sensitizing dye and a cosensitizer that can be used together with the (D) polymerization initiator, the ink composition of the invention may further contain various additives in accordance with the purposes. For example, an ultraviolet absorbent may be added to the ink composition of the invention, from the viewpoints of the improvement in the weather resistance of the obtained image and prevention of the discoloration of the image. An antioxidant may be used to improve the stability of the ink composition.

Other usable additives in the ink composition of the invention include: an organic or metal-complex-based anti-fading agent; an electric conductive salt for the control of the ejection properties, such as potassium thiocyanate, lithium nitrate, ammonium thiocyanate, or dimethylamine hydrochloride; and a trace amount of an organic solvent for the improvement of the adhesion to the recording medium.

The ink composition of the invention may further contain various polymer compounds for the purpose of the adjustment of the film physical properties.

Examples of polymer compounds include acrylic polymers, polyvinylbutyral resins, polyurethane resins, polyamide resins, polyester resins, epoxy resins, phenol resins, polycarbonate resins, polyvinylformal resins, shellac, vinyl resins, acrylic resins, rubber resin, waxes, and other natural resins. In an embodiment, two or more polymer compounds may be used simultaneously.

One or more substances selected from nonionic surfactants, cationic surfactants, and organic fluorocompounds may be added in the ink composition of the invention to control the liquid physical properties.

Other examples of usable additives, which may be added as necessary, include leveling additives, matting agents, waxes for controlling the film physical properties, and tackifiers, which do not inhibit polymerization, for improving the adhesion to recording medium such as polyolefin or PET.

<Physical Property of Ink Composition>

Considering the ejection efficiency, the ink composition of the invention preferably has an ink viscosity of 30 mPa·s or less, more preferably 20 mPa·s or less, at the temperature at the time of ejection. It is preferable to adjust and determine the composition properly so that the viscosity falls in the above range. The viscosity at 25° C. (room temperature) of the ink composition is preferably 200 mPa·s or less, and more preferably 100 mPa·s or less. By increasing the viscosity at room temperature, it becomes possible to prevent penetration of the ink into the recording medium even when a porous recording medium is used, to reduce the amount of uncured monomer and the odor, to suppress bleeding upon the deposition of ink droplets, and consequently to improve the image quality. An ink viscosity of more than 200 mPa·s at 25° C. may lead to a problem in delivery of ink liquid in some case.

The surface tension of the ink composition of the invention is preferably from 20 mN/m to 30 mN/m and more preferably from 23 mN/m to 28 mN/m. When the ink composition is used for recording on various recording media such as polyolefin, PET, coated paper, and non-coated paper, the surface tension is preferably 20 mN/m or more in view of the prevention of bleeding and penetration, and 30 mN/m or less in view of the wettability.

The ink composition of the invention thus adjusted is preferably used as an inkjet recording ink. Specifically, the ink composition of the invention is ejected onto a recording medium by an inkjet printer, and the ejected ink composition is cured by irradiation with actinic radiation rays to perform recording.

The printed article obtained using the ink composition is superior in the strength of the image area which is cured by irradiation with actinic radiation rays such as ultraviolet rays, and thus can be used not only for image formation with the ink but also for various applications including the formation of an ink-receiving layer (image area) of a planographic printing plate.

[Inkjet Recording Method and Inkjet Recording Apparatus]

The inkjet recording method and the inkjet recording apparatus which can be preferably used for the invention are described below.

In the inkjet recording method, it is preferable to eject the ink composition after the viscosity of ink composition is lowered to 30 mPa·s or less by heating the ink composition to 30° C. to 70° C., and in this manner, it is possible to realize highly stable ejection.

Generally, radiation-curable ink compositions are usually more viscous than aqueous inks, and the fluctuation in the viscosity of radiation-curable ink compositions caused by the fluctuation in temperature during printing is larger. The fluctuation in the viscosity of ink composition exerts significant influences on the droplet size and the droplet ejection speed, causing deterioration in image quality, and thus, it is necessary to keep the temperature of the ink composition as constant as possible during printing. It is preferable to control the ink composition temperature within ±5° C. from the set temperature, more preferably ±2° C. from the set temperature, and particularly preferably ±1° C. from the set temperature.

One of the characteristics of the inkjet recording apparatus is that it has a stabilizing device for the ink composition temperature. The temperature stabilizing device maintains a constant temperature of the ink composition in all the piping systems and members from the ink tank (from the intermediate tank if such an intermediate tank is present) to the ejection face on the nozzles.

The method of controlling the temperature is not particularly limited, and may be, for example, a method in which heating conditions are controlled according to the flow rate of the ink composition and the environmental temperature based on the information supplied from plural temperature sensors provided to the respective pipes. The heat unit to be heated is preferably insulated thermally such that the body of the apparatus is not affected by the outsidde temperature. In a preferable embodiment, the heat unit is thermally insulated form the other portions, and the total heat capacity of the heating unit is small, whereby the printer starting-up time required for heating is shortened and the heat energy loss is reduced.

An actinic radiation ray-curable ink composition can be obtained by adding the (D) photopolymerization initiator as the polymerization initiator to the ink composition of the invention.

Conditions of the irradiation to the ink composition with actinic radiation rays will be described below. A basic method of the irradiation with actinic radiation rays is disclosed in JP-A No. 60-132767, the disclosure of which is incorporated herein by reference. Specifically, light sources are disposed at both sides of a head unit that ejects the ink composition, and the ink composition is ejected while the head unit and the light sources are scanned in the shuttle mode. The ink composition is irradiated with the actinic radiation rays after a predetermined period from the deposition of the ink composition on the recording medium. Further, the ink composition is cured using another light source that is not driven. Specifically, WO No. 99/54415 (the disclosure of which is incorporated herein by reference) discloses an irradiation method comprising using an optical fiber and an irradiation method comprising irradiating the recording area (region having the ink composition deposited thereon) with UV rays by directing a collimated light from a light source to a mirror surface on the side of a head unit. These irradiation methods may be used in the invention.

Further, in the inkjet recording method according to the invention, it is preferable to heat the ink composition to a predetermined temperature and adjust the period from the deposition of the ink composition on the recording medium to the irradiation with actinic radiation rays to 0.01 second to 0.5 second, preferably 0.01 second to 0.3 second, and more preferably 0.01 second to 0.15 second. It becomes possible to prevent bleeding of the deposited ink composition before curing, by shortening the period from the deposition of the ink composition on the recording medium to the irradiation of actinic radiation rays to such an extremely short period. Further, since the ink composition is irradiated before penetrating deep into the recording medium where the light of the light source cannot reach, even when the recording medium is porous, the ink composition is surely irradiated, whereby the amount of the remaining unreacted monomer is reduced and consequently the odor is also reduced. The combination of the inkjet recording method and the ink composition of the invention provides a significant synergy effects. In particular, when the viscosity of the ink composition at 25° C. is 200 mPa·s or less, the advantageous effects of the invention are remarkable. By employing such an inkjet recording method, it is possible to maintain the dot diameter of the deposited ink composition constant and obtain an image with improved quality, on any of various recording media different in surface wettability. In order to obtain a color image, it is preferable to form images in the order from a color lower in lightness. When an ink of lower lightness is superposed, the actinic radiation rays are unlikely to reach the inks located at the bottom; therefore, curing sensitivity and improvement in adhesion are likely to be deteriorated, and the residual monomer is likely to increased to cause odor. Although it is possible conduct the irradiation all in at once after all colors are ejected, it is preferable to conduct the irradiation one by one after each color ink is ejected, in view of acceleration of curing.

The inkjet recording apparatus used in the invention is not particularly limited, and a commercial inkjet recording apparatus can be used. In other words, the recording on a recording medium (printing article) can be conducted by a commercial inkjet recording apparatus.

In the preferable ejecting conditions described above, although the ink composition of the invention is repeatedly heated and cooled, reduction in pigment dispersibility is avoided, excellent color forming property is achieved over a long period, and the deterioration of the ejection property caused by the aggregation of the pigment is also avoided owing to the function of the (A) polyallylamine derivative of the present invention, even when the ink composition is stored under such temperature conditions.

[Recording Medium (Printing Article)]

The recording medium to which the ink composition according to the invention is applicable is not particularly limited, and examples thereof include ordinary papers such as non-coated paper, coated paper and cardboard paper, various non-absorptive resin materials for use in so-called soft packaging, and resin films thereof formed in a film shape. Examples of such various plastic films include a PET film, OPS film, OPP film, ONy film, PVC film, PE film, and TAC film. Examples of other plastics usable as the material of the recording medium include polycarbonate, acrylic resins, ABS, polyacetal, PVA, and rubbers. In addition, metals and glasses are also usable as the recording media. Further, the recording media may be also usable in large area.

The printed article according to the invention can be obtained by depositing the ink composition of the invention onto a recording medium with an inkjet printer, and then irradiating the deposited ink composition with an actinic radiation ray, and thereby the ink composition is cured. Since the ink composition used for the formation of the image contains fine pigment particles uniformly and stably dispersed therein, the printed article of the invention has a high-quality image excellent in color forming property, sharpness, and weather resistance, thus being applicable to various fields.

EXAMPLES

Hereinafter, the present invention will be described in more detail by reference to the Examples, but the invention is not limited to these examples.

<Synthesis of (A) Polyallylamine Derivative>

—Synthesis of (PAAD-1-1)—

A mixture containing 50 parts of xylene and 100 parts of a 15% polyallylamine aqueous solution (PAA-15C, manufactured by Nittobo, weight average molecular weight: 15,000) was stirred at 160° C., followed by distilling away water. In the next place, 104 parts of polycaprolactone (weight average molecular weight: 500) in which the terminal hydroxy groups are esterified with stearic acid and 2 parts of anthraquinone-2-carboxylic acid were added to the mixture, followed by reacting at 160° C. for 3 hr under agitation.

After the reaction came to an end, xylene was distilled away, the residue was dissolved in 400 parts of acetone, followed by pouring into 2,000 parts of water under agitation, a precipitate was filtered, washed with water and dried, thereby a polyallylamine derivative (PAAD-1-1) was obtained (yield: 95 parts). A 1H-NMR spectrum (300 MHz, solvent: DMSO-$d_6$, TMS standard) of the resulting polyallylamine derivative (PAAD-1-1) is shown in FIG. 1.

From the 1H-NMR measurement, it was confirmed that the resulting polyallylamine derivative (PAAD-1-1) has a=17%, b=80%, c=3% and n=2 or 3 (a, b, and c are as def aforementioned.), as shown above on page 17. Furthermore, it was found that a weight average molecular weight of the resulting polyallylamine derivative (PAAD-1-1) is 16,000 from the GPC measurement.

The "n=2 or 3" means that the resulting polyallylamine derivative (PAAD-1-1) is a mixture having a structural unit of n=2 and a structural unit of n=3 as a main component.

—Synthesis of (PAAD-1-2)—

A mixture containing 50 parts of xylene and 75 parts of a 20% polyallylamine aqueous solution (PAA-03, manufactured by Nittobo, weight average molecular weight: 3,000) was stirred at 160° C., followed by distilling away water. In the next place, 360 parts of polycaprolactone (weight average molecular weight: 2,000) in which the terminal hydroxy groups are esterified with stearic acid and 3 parts of anthraquinone-2-carboxylic acid were added to the mixture, followed by reacting at 160° C. for 3 hr under agitation.

After the reaction came to an end, xylene was distilled away, the residue was dissolved in 400 parts of acetone, followed by pouring into 2,000 parts of water under agitation, a precipitate was filtered, washed with water and dried, thereby a polyallylamine derivative (PAAD-1-2) was obtained (yield: 250 parts). From the 1H-NMR measurement, it was confirmed that the resulting polyallylamine derivative (PAAD-1-2) has a=26%, b=70%, c=4% and n=16 (a, b, and c are as defined aforementioned.), as shown above on page 17. Furthermore, it was found that a weight average molecular weight of the resulting polyallylamine derivative (PAAD-1-2) is 3,800 from the GPC measurement.

—Synthesis of (PAAD-9-1)—

A polyallylamine derivative (PAAD-9-1) was obtained in a manner substantially similar to that in the synthesis of (PAAD-1-2) except that anthraquinone-2-carboxylic acid was changed to 9-anthracene carboxylic acid (yield: 260 parts). From the 1H-NMR measurement, it was confirmed that the resulting polyallylamine derivative (PAAD-9-1) has a=26%, b=70%, c=4% and n=16 (a, b, and c are as defined aforementioned.), as shown above on page 19. Furthermore, it was found that a weight average molecular weight of the resulting polyallylamine derivative (PAAD-9-1) is 3,700 from the GPC measurement.

—Synthesis of(PAAD-12-1)—

A polyallylamine derivative (PAAD-12-1) was obtained in a manner substantially similar that in the synthesis of (PAAD-1-2) except that 3 parts of anthraquinone-2-carboxylic acid was changed to 2 parts of 3, 5-dimethyl benzoic acid (yield: 250 parts). From the 1H-NMR measurement, it was confirmed that the resulting polyallylamine derivative (PAAD-12-1) has a=26%, b=70%, c=5% and n=16 (a, b, and c are as defined aforementioned.), as shown above on page 20. Furthermore, it was found that a weight average molecular weight of the resulting polyallylamine derivative (PAAD-12-1) is 3,700 from the GPC measurement.

—Synthesis of Comparative Polyallylamine Derivative C1 (Comparative Compound)—

A comparative polyallylamine derivative C1 was obtained in a manner substantially similar to that in the synthesis of the (PAAD-1-2) except that anthraquinone-2-carboxylic acid was not used (yield: 250 parts). From the 1H-NMR measurement, it was confirmed that the resulting comparative polyallylamine derivative C1 is a polyallylamine derivative (a=27%, b=73% and n=16) shown below. Furthermore, it was found that a weight average molecular weight of the resulting comparison polyallylamine derivative C1 is 3,700 from the GPC measurement.

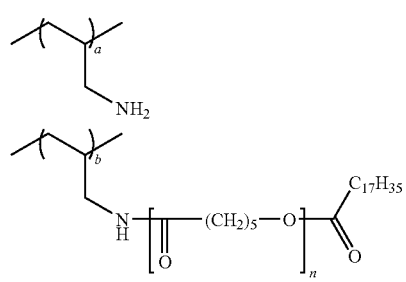

Comparative polyallylamine derivative C1: a=27%, b=73%, n=16, Mw=3,700

Example 1

The (A) polyallylamine derivative (PAAD-1-1) was dissolved in the mixture of the (C) polymerizable compounds (i) and (ii) described below, and introduced, together with the (B) pigment described below, into a motor mill M50 (manufactured by Eiger Co., Ltd.). The mixture was subjected to dispersing treatment for 3 hours at a peripheral speed of 9 m/s with zirconia beads of 0.65 mm in diameter, thus giving a stock solution of an actinic radiation ray-curable ink. Then, the (D) polymerization initiator described below was added to, and gently mixed with, the ink stock solution. The mixture obtained was then filtered under pressure through a membrane filter to give an actinic radiation ray-curable inkjet ink composition of Example 1. Addition amount of each of the (A) polyallylamine derivative (PAAD-1-1), the (B) pigment, the (C) polymerizable compounds (i) and (ii), and the (D) polymerization initiator are shown below.

| | |
|---|---|
| (A) Polyallylamine derivative (PAAD-1-1) | 1.5 gr. |
| (B) Pigment [quinacridone pigment PV-19] | 5.0 gr. |
| (C) Polymerizable compound | |
| [Propoxylated neopentyl glycol diacrylate] (i) (NPGPODA: manufactured by SARTOMER Co., Ltd.) | 60.0 gr. |
| [caprolactone-modified dipentaerythritol hexaacrylate] (ii) (DPCA-60: manufactured by NIPPON KAYAKU Co., Ltd.) | 27.5 gr. |
| (D) Polymerization initiator [acylphosphine oxide compound] (LUCIRIN TPO-L: manufactured by BASF)] | 5.0 gr. |

Examples 2 to 4

Actinic radiation ray-curable inkjet ink compositions of Examples 2 to 4 were obtained in a manner substantially similar to that in Example 1 except that the polyallylamine derivative (PAAD-1-2), (PAAD-9-1), and (PAAD-12-1) obtained in the Synthesis Example was used respectively in place of the (A) polyallylamine derivative (PAAD-1-1) used in Example 1.

Comparative Example 1

An actinic radiation ray-curable inkjet ink composition of Comparative Example 1 was obtained in a manner substantially similar to that in Example 1 except that a commercial polyester-based polymer dispersant "SOLSPERSE 24000GR" (manufactured by Japan Lubrizol Ltd.) was used in place of the (A) polyallylamine derivative (PAAD-1-1) used in Example 1.

Comparative Example 2

An actinic radiation ray-curable inkjet ink composition of Comparative Example 2 was obtained in a manner substantially similar to that in Example 1 except that the comparative polyallylamine derivative C1 obtained in the Synthesis Example was used in place of the (A) polyallylamine derivative (PAAD-1-1) used in Example 1.

Example 5 and Comparative Examples 3 and 4

Inkjet ink compositions of Example 5 and Comparative Examples 3 and 4 were obtained in a manner substantially similar to that in Example 2 and Comparative Examples 1 and 2 respectively, except that the quinacridone pigment PV-19 as the (B) pigment was changed to PY-120.

Example 6 and Comparative Examples 5 and 6

Inkjet ink compositions of Example 6 and Comparative Examples 5 and 6 were obtained in a manner substantially similar to that in Example 2 and Comparative Examples 1 ando 2 respectively, except that the (C) polymerizable compounds and the (D) polymerization initiator were changed as shown below:

| | | |
|---|---|---|
| (C) Polymerizable compound | (i): oxetane compound (OXT-221, manufactured by Toagosei Co., Ltd.) | 70.0 gr. |
| | (ii): epoxy compound (CELLOXIDE 3000: DAICEL CHEMICAL INDUSTRIES, Ltd) | 17.5 gr. |
| (D) Polymerization initiator: | triphenyl sulfonium salt (UVI-6992 manufactured by Dow Chemical, Ltd.) | 5.0 gr. |

Example 7 and Comparative Examples 7 and 8

Inkjet ink compositions of Example 7 and Comparative Examples 7 and 8 were obtained in a manner substantially similar to that in Example 6 and Comparative Examples 5 and 6 respectively, except that the quinacridone pigment PV-19 as the (B) pigment was changed to a phthalocyanine-based pigment PB 15:3.

(Evaluation of Ink Compositions)

The inkjet ink compositions obtained were evaluated according to the methods descried below. Results are shown in Table 1.

—Viscosity—

The viscosity of each inkjet ink composition at 40° C. was measured using an E-type viscometer.

A: less than 30 mPa·s.
B: 30 mPa·s or more but less than 100 Pas.
C: 100 mPa·s or more (problematic at ejection).

—Stability—

Each inkjet ink composition was stored at 25° C. for 1 month. Besides that, for another evaluation with respect to stability, each ink composition was stored at 60° C. for 28 days. Then, the dispersion state of the ink composition was evaluated visually with respect to the change in viscosity.

AA: Generation of precipitates is not observed, and viscosity is not increased.
A: Generation of precipitates is not observed. Although the viscosity is increased slightly, there is no problem about the ejection property.
B: Generation of precipitates is not observed. However, the viscosity is increased to deteriorate the ejection property, thus creating practical problems.
C: Generation of precipitates is observed.

—Average Particle Diameter—

A volume average particle diameter D50 of each inkjet ink composition was measured with a particle size distribution measuring instrument in light scattering diffraction system (LA910: manufactured by Horiba Ltd.), and was evaluated.

A: D50 is less than 100 nm.
B: D50 is 100 nm or more but less than 200 nm.
C: D50 is 200 nm or more.

—Curability—

Each ink composition was deposited on art paper with an inkjet printer (printing density 300 dpi, ejection frequency 4 kHz, number of nozzles 64) and then exposed to light at 300 mJ/cm$^2$ emitted by a Deep UV lamp (SP-7: manufactured by Ushio Inc.), whereby a printed sample was obtained.

Stickness of the cured film was evaluated by touching the film with fingers. Evaluation criteria are as follows:

A: Not sticky.
B: Slightly sticky.
C: Significantly sticky.

TABLE 1

| | Pigment Dispersant | Viscosity | Stability (room temperature) | Stability (60° C.) | Particle Diameter (D50) | Curability |
|---|---|---|---|---|---|---|
| Example 1 | PAAD-1-1 | A | AA | AA | A | A |
| Example 2 | PAAD-1-2 | A | AA | AA | A | A |
| Example 3 | PAAD-9-1 | A | AA | AA | B | A |
| Example 4 | PAAD-12-1 | B | AA | A | A | A |
| Comparative Example 1 | Commercial Dispersant | C | B | B | C | A |
| Comparative Example 2 | C1 | B | A | B | B | A |
| Example 5 | PAAD-1-2 | A | AA | AA | A | A |
| Comparative Example 3 | Commercial Dispersant | C | B | B | C | A |
| Comparative Example 4 | C1 | C | AA | A | C | A |
| Example 6 | PAAD-1-2 | A | AA | AA | A | A |
| Comparative Example 5 | Commercial Dispersant | C | B | B | C | A |
| Comparative Example 6 | C1 | B | A | B | B | A |
| Example 7 | PAAD-1-2 | A | AA | AA | A | A |
| Comparative Example 7 | Commercial Dispersant | C | B | B | B | A |
| Comparative Example 8 | C1 | B | A | A | B | A |

It is found from Table 1 that an ink composition that uses (A) a polyallylamine derivative of the invention is cured with high sensitivity to radiation ray irradiation, is capable of form a high quality image without tackiness and does not cause increase in the viscosity caused by deterioration of the pigment dispersibility even under long term storage, that is, is excellent in both of the dispersibility and the dispersion stability of the pigment.

The present invention provides a pigment composition excellent in the dispersibility and dispersion stability even when the pigment is made of fine particles. Furthermore, according to the invention, an ink composition suitable for inkjet recording, which uses the pigment composition of the invention, is capable of form high quality images having clear color tones and high tinting strength and is cured by irradiation with an actinic radiation ray, printed articles obtained by use of the ink composition, and an inkjet recording method that uses the ink composition are provided.

Furthermore, according to the invention, a polyallylamine derivative that is useful as a pigment dispersant excellent in the dispersibility and dispersion stability even when the pigment is formed of fine particles is provided.

Namely, the present invention may provide the following items <1> to <11>:

<1>. A pigment composition comprising at least: (A) a polyallylamine derivative which contains at least 1% to 50% by mol of a structural unit represented by the following Formula (1-a), 49% to 95% by mol of a structural unit represented by the following Formula (1-b) and 1% to 30% by mol of a structural unit represented by the following Formula (1-c); and (B) a pigment;

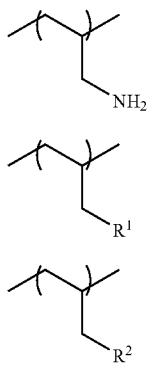

Formula (1-a)

Formula (1-b)

Formula (1-c)

wherein, in Formula (1-b), $R^1$ represents —NHCOR$^3$ or —NH$_3$$^+$OCOR$^3$, in which $R^3$ represents a residue obtained by removing a carboxy group from any one of polyester, polyamide or polyesteramide, each having a free carboxylic acid; and in Formula (1-c), $R^2$ represents —NHCOR$^4$ or —NH$_3$$^+$OCOR$^4$, in which $R^4$ represents an organic group having an aromatic ring or a heteroaromatic ring.

<2>. A ink composition comprising the pigment composition of item <1>, and (C) a polymerizable compound.

<3>. The ink composition of item <2>, further comprising (D) a polymerization initiator.

<4>. The ink composition of item <2> or item <3>, wherein $R^3$ is represented by any one of the following Formulae (2-a) through (5-a):

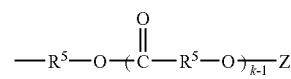

Formula (2-a)

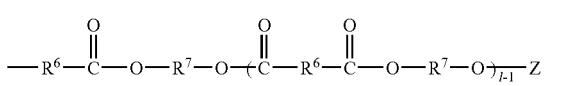

Formula (3-a)

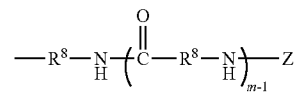

Formula (4-a)

Formula (5-a)

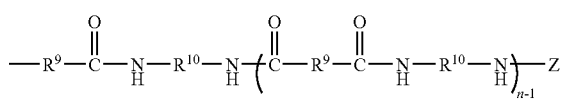

wherein, in Formulae (2-a) through (5-a), $R^5$, $R^8$ and $R^{10}$ each independently represent a straight or branched alkylene group having 2 to 20 carbon atoms; $R^6$ and $R^9$ each independently represent a straight or branched alkylene group having 2 to 20 carbon atoms, $C_6H_4$ or CH =CH; $R^7$ represents a straight or branched alkylene group having 2 to 20 carbon atoms or a residue obtained by removing two hydroxy groups from polyalkylene glycol; Z represents a hydrogen atom or —COR$^{13}$;

$R^{13}$ represents a monovalent organic group that does not have a hydroxy group; and k, l, m and n each independently represent an integer from 2 to 100.

<5>. The ink composition of any one of items <2> through <4>, wherein $R^4$ is a monovalent organic group represented by the following Formula (6) or (7):

—X—R$^{11}$        Formula (6)

—Y—R$^{12}$        Formula (7)

wherein, in Formulae (6) and (7), X and Y each independently represent a single bond, an alkylene group having 1 to 8 carbon atoms, —O—, —S—, —NH— or a combination thereof, $R^{11}$ represents a group having an aromatic ring, and $R^{12}$ represents a group having a heteroaromatic ring.

<6>. A use for inkjet recording of the ink composition of any one of items <2> through <5>.

<7>. A printed article obtained by curing the ink composition of any one of items <2> through <5> which has been applied on a recording medium.

<8>. An inkjet recording method comprising:

ejecting the ink composition of any one of items <2> through <5> on a recording medium; and irradiating an actinic radiation ray on the ejected ink composition to cure the ink composition.

<9>. A polyallylamine derivative comprising at least:

1% to 50% by mol of a structural unit represented by the following Formula (1-a);

49% to 95% by mol of a structural unit represented by the following Formula (1-b); and 1% to 30% by mol of a structural unit represented by the following Formula (1-c),

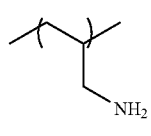

Formula (1-a)

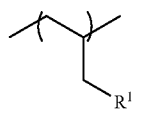

Formula (1-b)

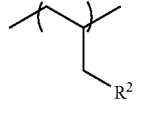

Formula (1-c)

wherein, in Formula (1-b), $R^1$ represents —NHCOR$^3$ or —NH$_3$$^+$OCOR$^3$, in which $R^3$ represents a residue obtained by removing a carboxy group from any one of polyester, polyamide or polyesteramide, each having a free carboxylic acid; and in Formula (1-c), $R^2$ represents —NHCOR$^4$ or —NH$_3$$^+$OCOR$^4$, in which $R^4$ represents an organic group having an aromatic ring or a heteroaromatic ring.

<10>. The polyallylamine derivative of item <9>, wherein $R^3$ is represented by any one of the following Formulae (2-a) through (5-a):

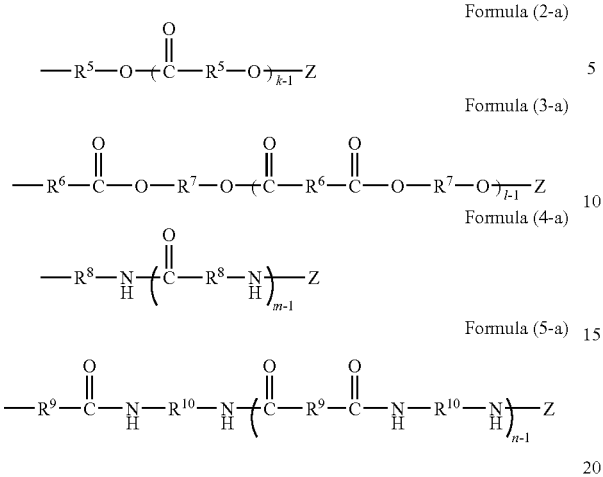

wherein, in Formulae (2-a) through (5-a), $R^5$, $R^8$ and $R^{10}$ each independently represent a straight or branched alkylene group having 2 to 20 carbon atoms; $R^6$ and $R^9$ each independently represent a straight or branched alkylene group having 2 to 20 carbon atoms, $C_6H_4$ or CH=CH; $R^7$ represents a straight or branched alkylene group having 2 to 20 carbon atoms or a residue obtained by removing two hydroxy groups from polyalkylene glycol; Z represents a hydrogen atom or —$COR^{13}$;

$R^{13}$ represents a monovalent organic group that does not have a hydroxy group; and k, l, m and n each independently represent an integer from 2 to 100.

<11>. The polyallylamine derivative of item <9> or item <10>, wherein $R^4$ is a monovalent organic group represented by the following Formula (6) or (7):

—X—$R^{11}$    Formula (6)

—Y—$R^{12}$    Formula (7)

wherein, in Formulae (6) and (7), X and Y each independently represent a single bond, an alkylene group having 1 to 8 carbon atoms, —O—, —S—, —NH— or a combination thereof, $R^{11}$ represents a group having an aromatic ring, and $R^{12}$ represents a group having a heteroaromatic ring.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A pigment composition comprising at least: (A) a polyallylamine derivative which contains at least 1% to 50% by mol of a structural unit represented by the following Formula (1-a), from 49% to 95% by mol of a structural unit represented by the following Formula (1-b), and from 1% to 30% by mol of a structural unit represented by the following Formula (1-c); and (B) a pigment;

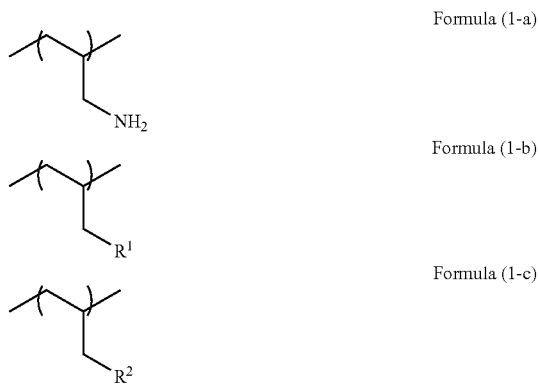

wherein, in Formula (1-b), $R^1$ represents —NHCOR or —$NH_3^+OCOR^3$, in which $R^3$ represents a residue obtained by removing a carboxy group from any one of polyester, polyamide or polyesteramide, each having a free carboxylic acid; and in Formula (1-c), $R^2$ represents —$NHCOR^4$ or —$NH_3^+OCOR^4$, in which $R^4$ represents an organic group having an aromatic ring or a heteroaromatic ring.

2. An ink composition comprising the pigment composition of claim 1, and (C) a polymerizable compound.

3. The ink composition of claim 2, further comprising (D) a polymerization initiator.

4. The ink composition of claim 2, wherein $R^3$ is represented by any one of the following Formulae (2-a) through (5-a):

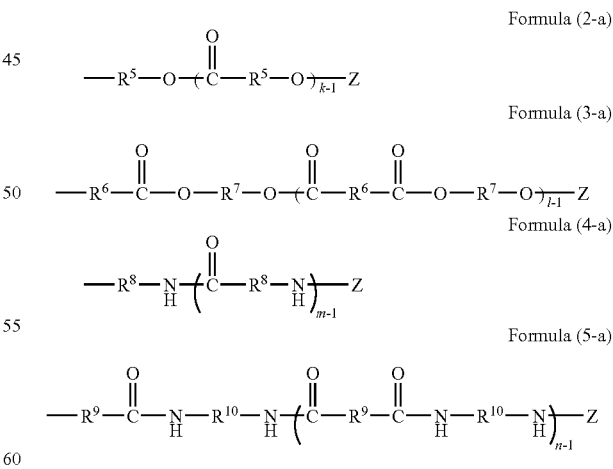

wherein, in Formulae (2-a) through (5-a), $R^5$, $R^8$ and $R^{10}$ each independently represent a straight or branched alkylene group having 2 to 20 carbon atoms; $R^6$ and $R^9$ each independently represent a straight or branched alkylene group having 2 to 20 carbon atoms, $C_6H_4$ or CH=CH; $R^7$ represents a straight or branched alkylene group having 2 to 20 carbon atoms or a residue obtained by removing two hydroxy groups from polyalkylene glycol; Z represents a hydrogen atom or —COR$^{13}$;

R$^{13}$ represents a monovalent organic group that does not have a hydroxy group; and k, l, m and n each independently represent an integer from 2 to 100.

5. The ink composition of claim 2, wherein R$^4$ is a monovalent organic group represented by the following Formula (6) or (7):

—X—R$^{11}$     Formula (6)

—Y—R$^{12}$     Formula (7)

wherein, in Formula (6) and Formula (7), X and Y each independently represent a single bond, an alkylene group having 1 to 8 carbon atoms, —O—, —S—, —NH— or a combination thereof, R$^{11}$ represents a "group having an aromatic ring"; and R$^{12}$ represents a "group having a heteroaromatic ring".

6. The ink composition of claim 2, wherein the ink composition is for use in inkjet recording.

7. A printed article obtained by curing the ink composition of claim 2 which has been applied on a recording medium.

8. An inkjet recording method comprising:
ejecting the ink composition of claim 2 on a recording medium; and
irradiating an actinic radiation ray on the ejected ink composition to cure the ink composition.

9. A polyallylamine derivative comprising at least:
1% to 50% by mol of a structural unit represented by the following Formula (1-a);
49% to 95% by mol of a structural unit represented by the following Formula (1-b); and
1% to 30% by mol of a structural unit represented by the following Formula (1-c), Formula (1-a)

Formula (1-b)

Formula (1-c)

wherein, in Formula (1-b), R$^1$ represents —NHCOR$^3$ or —NH$_3^+$OCOR$^3$, in which R$^3$ represents a residue obtained by removing a carboxy group from any one of polyester, polyamide or polyesteramide, each having a free carboxylic acid; and in Formula (1-c), R$^2$ represents —NHCOR$^4$ or —NH$_3^+$OCOR$^4$ in which R$^4$ represents an organic group having an aromatic ring or a heteroaromatic ring.

10. The polyallylamine derivative of claim 9, wherein R$^3$ is represented by any one of the following Formulae (2-a) through (5-a):

$$—R^5—O{+\!\!\!\!\!-}\overset{O}{\underset{}{C}}—R^5—O{-\!\!\!\!\!+}_{k-1}Z$$     Formula (2-a)

$$—R^6—\overset{O}{\underset{}{C}}—O—R^7—O{+\!\!\!\!\!-}\overset{O}{\underset{}{C}}—R^6—\overset{O}{\underset{}{C}}—O—R^7—O{-\!\!\!\!\!+}_{l-1}Z$$     Formula (3-a)

$$—R^8—\underset{H}{N}{+\!\!\!\!\!-}\overset{O}{\underset{}{C}}—R^8—\underset{H}{N}{-\!\!\!\!\!+}_{m-1}Z$$     Formula (4-a)

$$—R^9—\overset{O}{\underset{}{C}}—\underset{H}{N}—R^{10}—\underset{H}{N}{+\!\!\!\!\!-}\overset{O}{\underset{}{C}}—R^9—\overset{O}{\underset{}{C}}—\underset{H}{N}—R^{10}—\underset{H}{N}{-\!\!\!\!\!+}_{n-1}Z$$     Formula (5-a)

wherein, in Formulae (2-a) through (5-a), R$^5$, R$^8$ and R$^{10}$ each independently represent a straight or branched alkylene group having 2 to 20 carbon atoms; R$^6$ and R$^9$ each independently represent a straight or branched alkylene group having 2 to 20 carbon atoms, C$_6$H$_4$ or CH=CH; R$^7$ represents a straight or branched alkylene group having 2 to 20 carbon atoms or a residue obtained by removing two hydroxy groups from polyalkylene glycol; Z represents a hydrogen atom or —COR$^{13}$;

R$^{13}$ represents a monovalent organic group that does not have a hydroxy group; and k, l, m and n each independently represent an integer from 2 to 100.

11. The polyallylamine derivative of claim 9, wherein R$^4$ is a monovalent organic group represented by the following Formula (6) or (7):

—X—R$^{11}$     Formula (6)

—Y—R$^{12}$     Formula (7)

wherein, in Formula (6) and Formula (7), X and Y each independently represent a single bond, an alkylene group having 1 to 8 carbon atoms, —O—, —S—, —NH— or a combination thereof, R$^{11}$ represents a "group having an aromatic ring"; and R$^{12}$ represents a "group having a heteroaromatic ring".

* * * * *